(12) United States Patent
Shapira et al.

(10) Patent No.: US 9,940,400 B2
(45) Date of Patent: Apr. 10, 2018

(54) ACCESSING SOFTWARE APPLICATION FUNCTIONALITY IN SEARCH

(71) Applicant: Samsung Electronics Co., Ltd., Suwon-si, Gyeonggi-do (KR)

(72) Inventors: Liron Shapira, Mountain View, CA (US); Eric J. Glover, Palo Alto, CA (US); Shravan Sogani, San Ramon, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 388 days.

(21) Appl. No.: 14/588,219

(22) Filed: Dec. 31, 2014

(65) Prior Publication Data
US 2015/0242422 A1 Aug. 27, 2015

Related U.S. Application Data

(60) Provisional application No. 61/943,105, filed on Feb. 21, 2014.

(51) Int. Cl.
*G06F 17/30* (2006.01)
*G06F 3/0484* (2013.01)
(Continued)

(52) U.S. Cl.
CPC ...... *G06F 17/3087* (2013.01); *G06F 3/04842* (2013.01); *G06F 8/61* (2013.01);
(Continued)

(58) Field of Classification Search
USPC .................................................. 707/706, 722
See application file for complete search history.

(56) References Cited

U.S. PATENT DOCUMENTS 8,924,958 B1 * 12/2014 Bangur ..................... G06F 8/61
717/168
9,589,033 B1 * 3/2017 Kuscher ............ G06F 17/30864
(Continued)

OTHER PUBLICATIONS

App Indexing: <https://web.archive.org/web/20140225132807/https://developers.google.com/app-indexing/webmasters/>, Dec. 4, 2013.
(Continued)

*Primary Examiner* — Kim Nguyen
(74) *Attorney, Agent, or Firm* — Jefferson IP Law, LLP

(57) ABSTRACT

A method includes transmitting a search query from a computing device to a search system configured to generate search results in response to a received search query, and receiving search results from the search system in response to transmitting the search query. The search results include an application access mechanism that references a native application and indicates one or more operations for the application to perform. The application performing the operations sets the application into an application state. The search results also include an application download address that indicates a location for downloading the application. The method also includes generating a user selectable link that includes the application access mechanism and the application download address, and displaying the user link. In response to receiving a user selection of the selectable link, the method also includes downloading, installing, launching, and causing the native application to perform the one or more operations.

20 Claims, 16 Drawing Sheets

(51) Int. Cl.

| | | |
|---|---|---|
| *G06F 9/445* | (2018.01) | |
| *H04L 29/08* | (2006.01) | |
| *G06Q 10/06* | (2012.01) | |
| *H04W 4/02* | (2018.01) | |
| *H04W 4/20* | (2018.01) | |
| *G06Q 30/02* | (2012.01) | |

(52) U.S. Cl.
CPC .... *G06F 17/3053* (2013.01); *G06F 17/30241* (2013.01); *G06F 17/30424* (2013.01); *G06F 17/30864* (2013.01); *G06F 17/30867* (2013.01); *G06F 17/30882* (2013.01); *G06Q 10/067* (2013.01); *G06Q 30/0282* (2013.01); *H04L 67/10* (2013.01); *H04W 4/022* (2013.01); *H04W 4/20* (2013.01)

(56) References Cited

U.S. PATENT DOCUMENTS

| | | | |
|---|---|---|---|
| 2007/0211871 A1 | 9/2007 | Sjolander et al. | |
| 2011/0072001 A1 | 3/2011 | Basu et al. | |
| 2012/0109944 A1 | 5/2012 | Hao | |
| 2012/0197765 A1* | 8/2012 | Kim | G06Q 30/0601 705/27.1 |
| 2012/0316955 A1 | 12/2012 | Panguluri et al. | |
| 2013/0132896 A1 | 5/2013 | Lee et al. | |
| 2013/0290344 A1 | 10/2013 | Glover et al. | |
| 2013/0337873 A1* | 12/2013 | Yang | G06F 9/4443 455/566 |
| 2014/0052683 A1 | 2/2014 | Kirkham et al. | |
| 2014/0250106 A1 | 9/2014 | Shapira et al. | |
| 2014/0330769 A1* | 11/2014 | Nguyen | G06Q 10/10 707/609 |
| 2015/0140982 A1* | 5/2015 | Postrel | H04W 4/008 455/418 |
| 2015/0193546 A1 | 7/2015 | Lipton et al. | |
| 2015/0242420 A1 | 8/2015 | Glover et al. | |
| 2015/0242421 A1 | 8/2015 | Glover et al. | |
| 2015/0242462 A1 | 8/2015 | Shapira et al. | |
| 2015/0242507 A1 | 8/2015 | Shapira et al. | |
| 2016/0162555 A1* | 6/2016 | Shapira | G06F 17/30554 707/722 |
| 2016/0188708 A1* | 6/2016 | Glover | G06F 17/30867 707/722 |
| 2017/0070404 A1* | 3/2017 | Gokul | H04L 67/16 |

OTHER PUBLICATIONS

App Indexing Technical Details: <https://web.archive.org/web/20140210182226/https://developers.google.com/app-indexing/webmasters/details>, Feb. 1, 2014.
Indexing Apps Just Like Websites: <http://googlewebmastercentral.blogspot.com/2013/10/indexing-apps-just-like-websites.html>, Oct. 31, 2013.
Google Search Now Discovers Content Within Android Apps: http://searchengineland.com/google-search-now-discovers-content-within-android-apps-178960, Dec. 4, 2013.
Google's Search Results Can Deep-Link to Your Android Apps: <http://techcrunch.com/2013/10/31/android-4-4-kitkat-app-indexing/>, Oct. 31, 2013.
U.S. Appl. No. 14/572,249, filed Dec. 16, 2014, Julia Lipton.
U.S. Appl. No. 14/586,104, filed Dec. 30, 2014, Eric Glover.
U.S. Appl. No. 14/586,250, filed Dec. 30, 2014, Eric Glover.
U.S. Appl. No. 14/588,195, filed Dec. 31, 2014, Liron Shapira.
U.S. Appl. No. 14/588,268, filed Dec. 31, 2014, Liron Shapira.
International Search Report and Written Opinion for related WO Application No. PCT/US2015/016866, dated May 26, 2015.

* cited by examiner

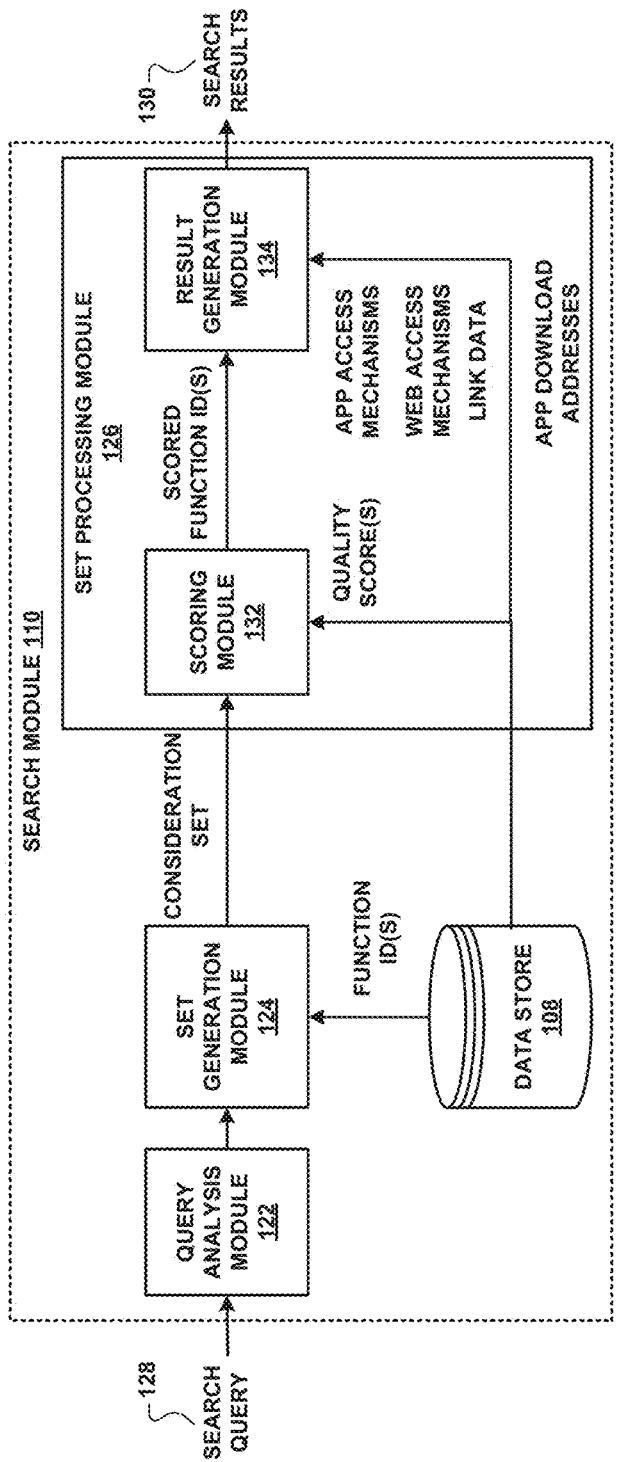
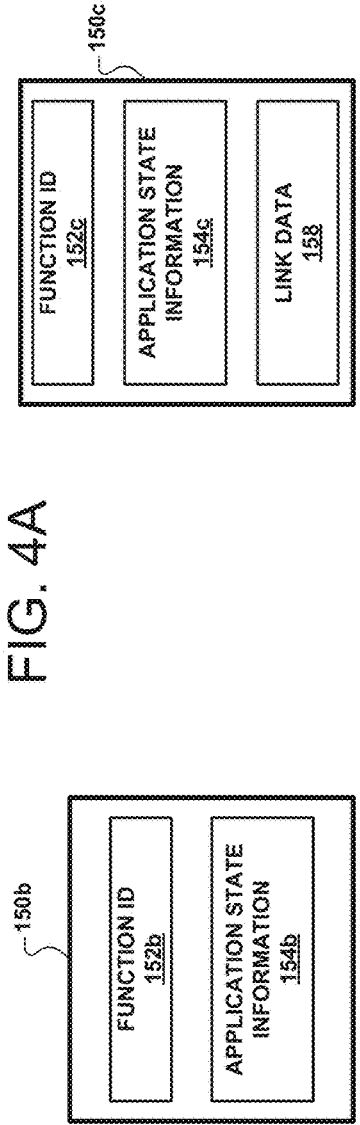

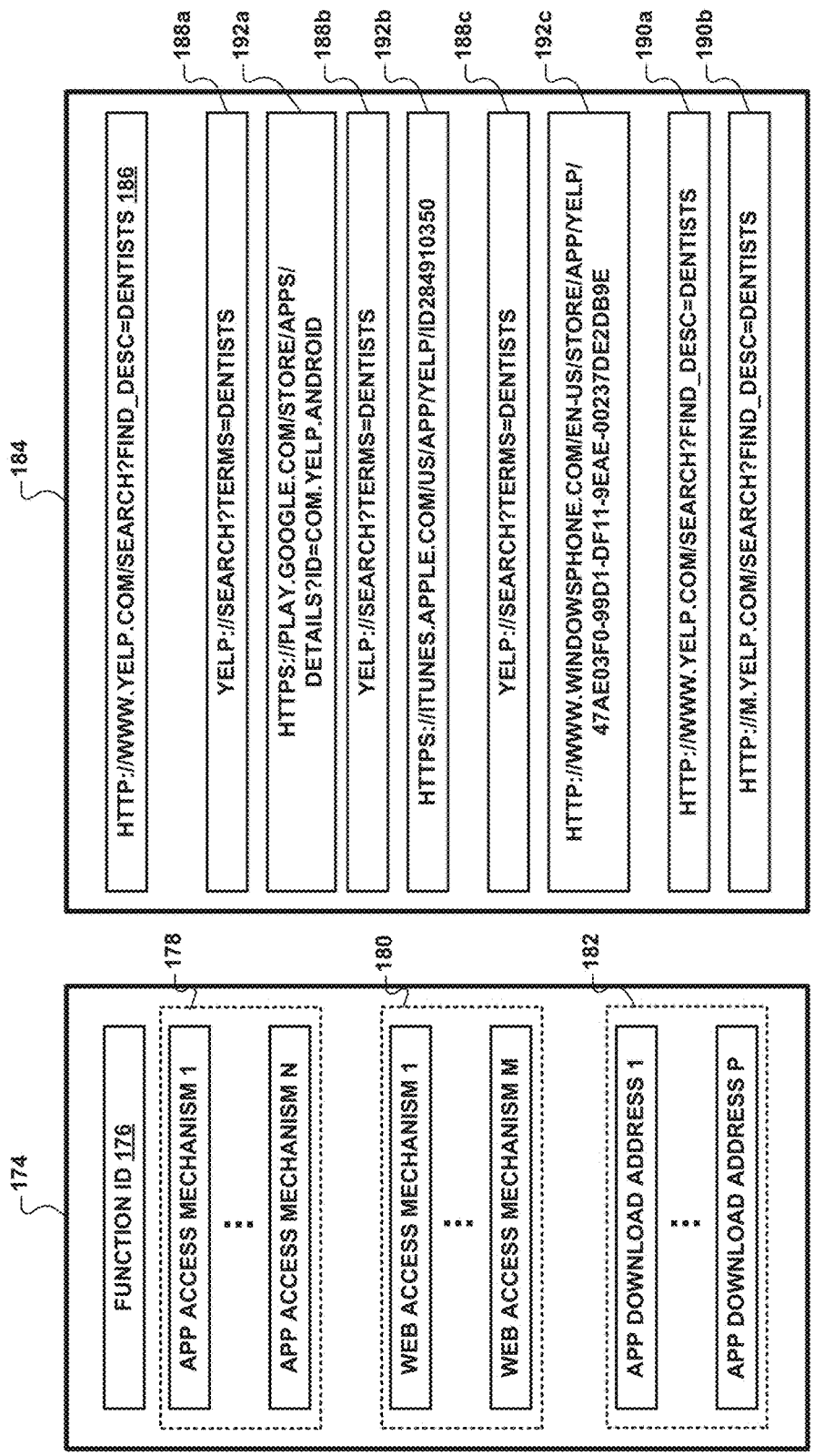

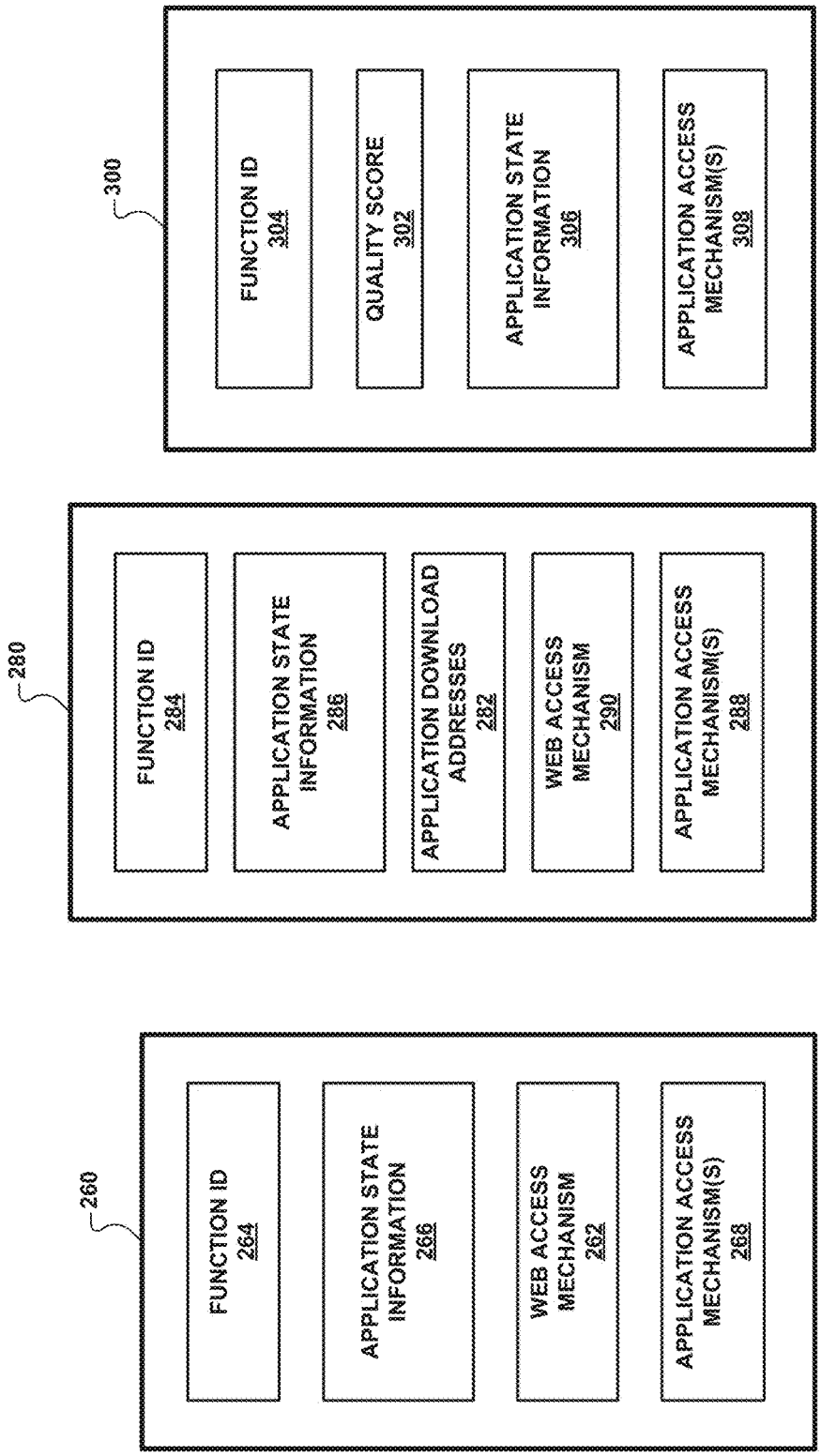

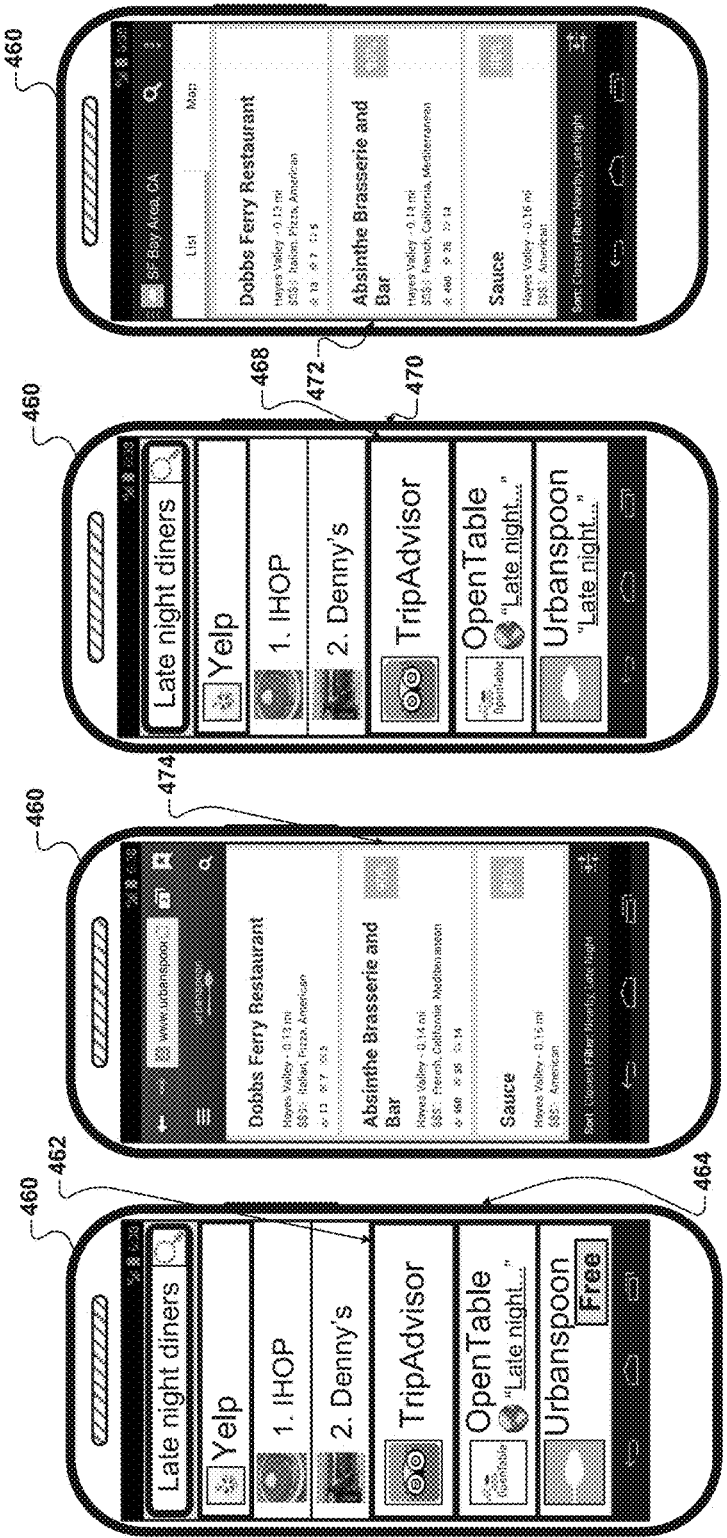

ACCESSING SOFTWARE APPLICATION FUNCTIONALITY IN SEARCH

CROSS-REFERENCE TO RELATED APPLICATION

This application claims priority under 35 U.S.C. § 119(e) to U.S. Provisional Application 61/943,105, filed Feb. 21, 2014, which is hereby incorporated by reference in its entirety.

TECHNICAL FIELD

This disclosure generally relates to the field of search, and more particularly to techniques for generating search results that correspond to states within software applications.

BACKGROUND

In recent years, the use of computers, smartphones, and other Internet-connected computing devices has grown significantly. Correspondingly, the number of software applications available for such computing devices has also grown. Today, many diverse software applications can be accessed on a number of different computing devices, including, but not limited to, smartphones, personal computers, automobiles, and televisions. These software applications can include business driven applications, games, educational applications, news applications, shopping applications, messaging applications, media streaming applications, and social networking applications, as some examples. Because of the large number of software applications available today and the wide range of functionality they provide, computing device users often require the ability to search for and access specific software application functionality.

SUMMARY

One aspect of the disclosure provides a method that includes transmitting a search query to a search system configured to generate search results in response to a received search query, and receiving search results from the search system in response to transmitting the search query. The search results include an application access mechanism (AAM) that references a native application and indicates one or more operations for the native application to perform. The search results also include an application download address that indicates a location at which the native application may be downloaded. The method further includes generating a user selectable link that includes the AAM and the application download address, and displaying the user selectable link. The method also includes receiving a user selection of the user selectable link, and, in response to receiving the user selection, downloading the native application using the application download address, installing the native application, launching the native application, and causing the native application to perform the one or more operations.

Implementations of the disclosure may include one or more of the following optional features. In some implementations, the AAM specifies an application state of the native application referenced by the AAM, and the native application performing the one or more operations indicated by the AAM sets the native application into the application state. In some examples, the method further includes receiving a user input, and the downloading, installing, and launching the native application, and causing the native application to perform the one or more operations includes downloading, installing, and launching the native application, and causing the native application to perform the one or more operations in response to receiving the user selection and in response to receiving the user input. In this example the user selectable link includes a first user selectable link, and the user selection includes a first user selection.

The downloading, installing, and launching the native application, and causing the native application to perform the one or more operations in response to receiving the user selection and in response to receiving the user input may further include accessing the location indicated by the application download address in response to receiving the first user selection, displaying a graphical user interface (GUI) associated with the location, the GUI including a second user selectable link that is different than the first user selectable link, and in response to receiving the second user selection, downloading the native application from the location, installing the native application, launching the native application, and causing the native application to perform the one or more operations. The downloading, installing, and launching the native application, and causing the native application to perform the one or more operations in response to receiving the user selection and in response to receiving the user input may further include downloading the native application from the location, and installing the native application in response to receiving the user selection, and in response to receiving the user input, launching the native application, and causing the native application to perform the one or more operations. The user selectable link may include a first user selectable link and the user selection including a first selection. The launching the native application and causing the native application to perform the one or more operations may include generating a second user selectable link that is different than the first use selectable link that includes the AAM and displaying the second user selectable link. Here, the user input may include a second user selection of the second user selectable link that is different than the first user selection. In response to receiving the second user selection, the method may include launching and causing the native application to perform the one or more operations. The AAM may include a first AAM and the search results may further include a second AAM that is different than the first AAM. In some examples, the first and second AAMs reference different editions of the native application and the method further includes determining that the first AAM references the edition of the native application downloaded from the location indicated by the application download address and the generating the second user selectable link includes generating the second user selectable link such that the second user selectable link includes the first AAM and excludes the second AAM based on the determination.

In some examples, the AAM may include a first AAM and the search results may further include a second AAM that is different than the first AAM. In some examples, the first and second AAMs reference different editions of the native application and the generating the second user selectable link includes generating the second user selectable link such that the second user selectable link further includes the second AAM. In the example, the method may further include determining that the first AAM references the edition of the native application downloaded from the location indicated by the application download address and the launching and causing the native application to perform the one or more operations in response to receiving the second user selection includes launching the native application and causing the native application to perform the one or more operations based on the determination.

In some implementations, the method further includes transmitting an indication that the native application is not installed to the search system, and the receiving the search from the search system includes receiving the search results such that the search results include the application download address in response to transmitting the indication.

In some examples, the AAM specifies an application state of the native application and the search results further include a web access mechanism (WAM) that references a web-based application and indicates one or more operations for the web-based application to perform. The WAM may specify a web application state of the web-based application, that while performing the one or more operations sets, the web-based application into the web application state. In some examples, the application state of the web-based application is similar to the application state of the native application, and the generating the user selectable link includes generating the user selectable link such that the user selectable link further includes the WAM. The method may further include, in response to receiving the user selection, launching the web-based application, and causing the web-based application to perform the one or more operations indicated by the WAM. The WAM may be configured to direct a web browser application to a web version of the application state of the native application specified by the AAM. In some examples, the method also includes receiving a user input at the input device and launching the web-based application and causing the web-based application to perform the one or more operations in response to receiving the user selection and in response to receiving the user input. In some examples, the method also includes performing one or more of the following: (1) suspending the web-based application; (2) altering a visible area of the web-based application; (3) minimizing the web-based application; (4) moving the web-based application to the background; and (5) terminating the web-based application. The performing the one of minimizing, moving to the background, and terminating the web-based application may include performing the one of minimizing, moving to the background, and terminating the web-based application upon completing one or more of downloading, installing, and launching the native application, and causing the native application to perform the one or more operations. In some examples, the method further includes receiving a user input at the computing device, and the performing the one of minimizing, moving to the background, and terminating the web-based application includes performing the one of minimizing, moving to the background, and terminating the web-based application in response to receiving the user input.

In some examples, the method further includes transmitting an indication that the native application is not installed to the search system, and the receiving the search from the search system includes receiving the search results such that the search results include the WAM in response to transmitting the indication.

In some implementations, the search results further include link data associated with the AAM and the link data includes one or more of text and image data describing the AAM. The generating the user selectable user link includes generating the user selectable link using the link data in this implementation. The AAM may specify an application state of the native application and the performing the one or more operations indicated by the AAM sets the native application into the application state. The one or more of text and image data included in the link data may describe the application state.

Another aspect of the disclosure provides a system including one or more computing devices configured to transmit a search query to a search system configured to generate search results in response to a received search query, and receive search results from the search system in response to transmitting the search query. The search results include an AAM that references a native application and indicates one or more operations for the native application to perform. The search results also include an application download address that indicates a location at which the native application may be downloaded. The one or more computing devices are further configured to generate a user selectable link that includes the AAM and the application download address, and display the user selectable link. The one or more computing devices are also configured to receive a user selection of the user selectable link, and, in response to receiving the user selection, download the native application using the application download address, install the native application, launch the native application, and cause the native application to perform the one or more operations.

Another aspect of the disclosure provides a non-transitory computer-readable storage medium including instructions that cause one or more computing devices to transmit a search query to a search system configured to generate search results in response to a received search query, and receive search results from the search system in response to transmitting the search query. The search results include an AAM that references a native application and indicates one or more operations for the native application to perform. The search results also include an application download address that indicates a location at which the native application may be downloaded. The instructions further cause the one or more computing devices to generate a user selectable link that includes the AAM and the application download address, and display the user selectable link. The instructions also cause the one or more computing devices to receive a user selection of the user selectable link, and, in response to receiving the user selection, download the native application using the application download address, install the native application, launch the native application, and cause the native application to perform the one or more operations.

The details of one or more implementations of the disclosure are set forth in the accompanying drawings and the description below. Other aspects, features, and advantages will be apparent from the description and drawings, and from the claims.

BRIEF DESCRIPTION OF DRAWINGS

FIG. 4A is a functional block diagram of another example search module.

FIGS. 4B-4C are schematic views of other example function records.

FIG. 4D-4E are schematic views of example access tables.

FIGS. 9-11 are schematic views of example function records that include web access mechanisms, application download addresses, and quality scores, respectively.

FIGS. 16A-16D are schematic views of other example GUIs that may be generated on a user device according to the present disclosure.

DETAILED DESCRIPTION

Figure 1:
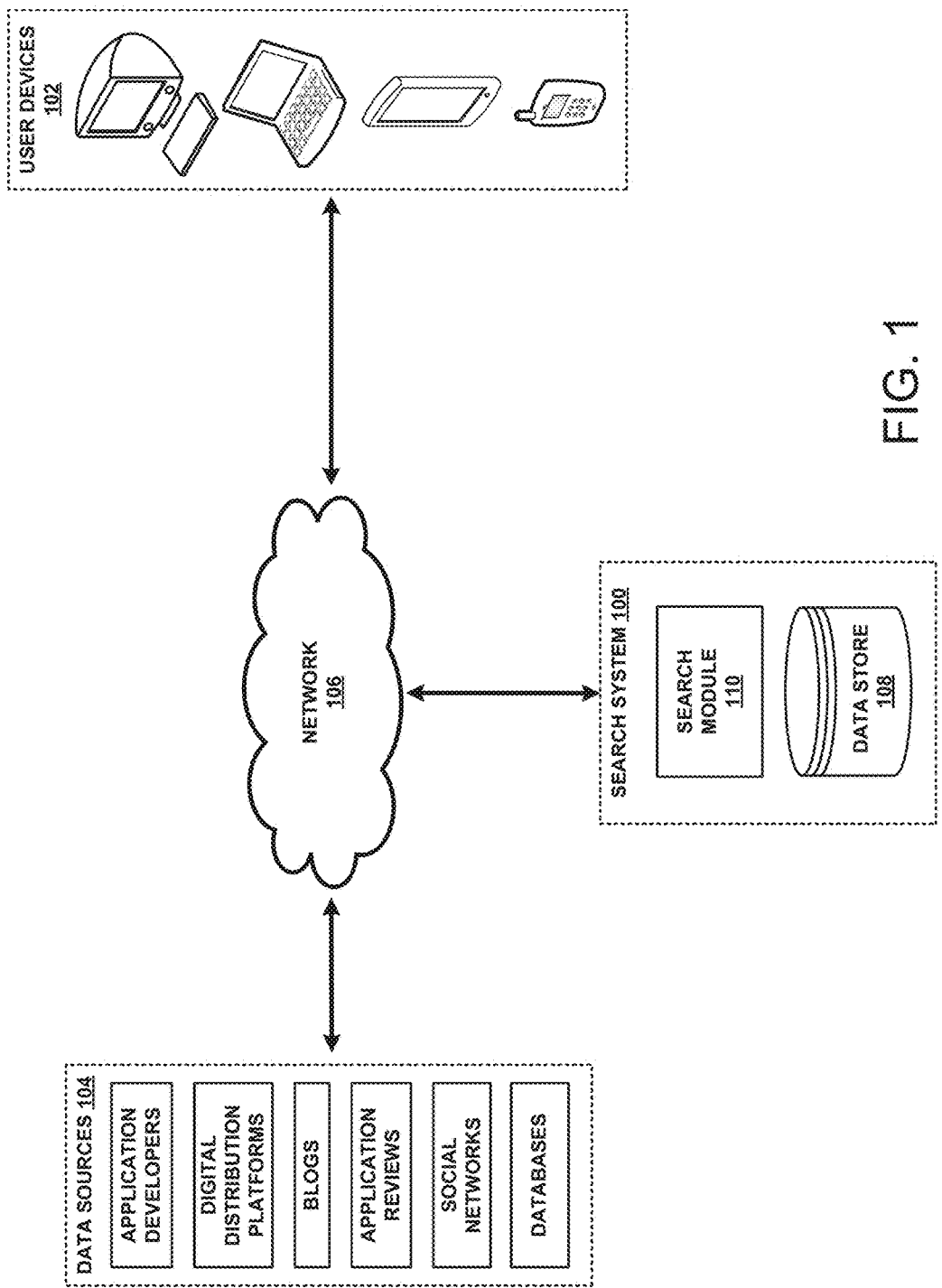
FIG. 1 is a schematic view of an example environment including a search system.

A search system of the present disclosure receives a search query from a user device and generates search results in response to the received search query. The search system transmits the search results to the user device that generated the search query. The search results include a list of application access mechanisms (AAMs) that may be selected by a user. An AAM may be a string that includes a reference to a native application and indicates one or more operations for a user device to perform. In response to selection of an AAM on a user device, the user device may launch the native application referenced in the AAM and perform the one or more operations indicated in the AAM.

Native applications can perform a variety of different functions for a user. For example, a restaurant reservation application can make reservations for restaurants. As another example, an internet media player application can stream media (e.g., a song or movie) from the Internet. In some examples, a single native application can perform more than one function. For example, a restaurant reservation application may also allow a user to retrieve information about a restaurant and read user reviews for the restaurant in addition to making reservations. As another example, an internet media player application may also allow a user to perform searches for digital media, purchase digital media, and generate media playlists.

An AAM includes data that a user device can use to access functionality provided by a native application. For example, an AAM can include data that causes a user device to launch a native application and perform a function associated with the native application. Performance of a function according to the AAM may set the native application into a specified state. Accordingly, the process of launching a native application and performing a function according to an AAM may be referred to herein as launching the native application and setting the native application into a state that is specified by the AAM. In one example, an AAM for a restaurant reservation application can include data that causes a user device to launch the restaurant reservation application and make a reservation at a restaurant. In this example, the restaurant reservation application may be set in a state that displays reservation information to a user, such as a reservation time, a description of the restaurant, and user reviews. In another example, an AAM for an internet media player application can include data that causes a user device to launch the internet media player application and stream media from the Internet. In this example, the internet media player application may be set in a state that displays information regarding the media (e.g., music) being streamed, such as a song, artist, or album name.

AAMs may have various different formats and content. The format and content of an AAM may depend on the native application with which the AAM is associated and the operations that are to be performed by the native application in response to selection of the AAM. For example, an AAM for an internet music player application may differ from an AAM for a shopping application. An AAM for an internet music player application may include references to musical artists, songs, and albums, for example. The AAM for the internet music player application may also reference operations, such as randomizing a list of songs and playing a song or album. An AAM for a shopping application may include references to different products that are for sale. The AAM for the shopping application may also include references to one or more operations, such as adding products to a shopping cart and proceeding to a checkout.

The search system transmits additional data in the search results along with the AAMs. For example, the search system may transmit data (e.g., text and/or images) which may be used by the user device to generate user selectable links (or "links") in the search results. A link may include text and/or images that a user may select (e.g., touch, or click on) via a user interface of the user device. Each user selectable link may be associated with an AAM such that when a user selects a link, the user device launches the native application referenced in the AAM and performs the one or more operations indicated in the AAM. The text and/or images of a link displayed to a user may indicate the operations that will be performed in response to selection of the link. For example, if the link is to a song in a music playing application, the text and/or images may identify the music playing application that will be launched by the user device and the song that will be played by the music playing application when the user selects the link. Example links are illustrated in FIGS. 2, 7A, 12, 14A, 14C, 16A, and 16C.

A user may select a link to cause the user device to launch the native application identified in the link and perform one or more operations according to the AAM associated with the link. Put another way, when a user selects a link, the user device launches a native application and sets the native application into a state defined by the AAM associated with the link. In general, a state of a native application may refer to the operations and/or the resulting outcome of the native application in response to selection of a link. A state of a native application may also be referred to herein as an "application state."

An application state specified by an AAM may depend on the functionality provided by the native application. For example, if a native application is configured to retrieve and display information from the Internet, the native application can be set into a state in which the native application retrieves information from the Internet and displays information to the user. In another example, if a native application is configured to play media from the Internet (e.g., music and/or video), the native application can be set into a state in which the native application is playing a song or a movie from the Internet. In another example, if a native application is configured to make restaurant reservations, the native application can be set into a state in which the native application displays available restaurant reservations to the user.

The search system includes a data store that the search system uses to generate the search results. The data store includes one or more different function records (e.g., the function record 150a of FIG. 3B). Each function record may include data related to a function of a native application and/or the state of the native application resulting from performance of the function. As described herein, a function record may include a function identifier (ID), application state information (ASI), and an AAM.

An AAM included in a function record includes data that causes a user device to launch a native application and perform a function associated with the native application. For example, an AAM included in a function record may be a string that includes a reference to a native application and indicates one or more operations for a user device (e.g., the native application) to perform. An AAM may include an application resource identifier (ARI) and/or one or more operations for the user device to perform. An ARI may be a string having an application specific scheme in some examples. The ARI may include a reference to a native application and indicate one or more operations for the user device (e.g., the native application) to perform. For example, the ARI may include a reference to a native application, a domain name, and a path to be used by the application to retrieve and display information to the user.

In some examples, the AAM may include operations for the user device to perform in addition to the operation(s) indicated in the ARI. For example, a search application on the user device, an operating system (OS) of the user device, and/or a native application on the user device may perform the operations included in the AAM. In some examples, the operations may be included in a script. Examples of operations may include, but are not limited to, launching a native application, creating and sending a search request to an application server, setting a current geographic location in a native application, making a restaurant reservation, sending a text message, and adding an appointment to a calendar.

In some examples, an AAM may not include an ARI. Instead, the AAM can include one or more operations that reference a native application and indicate one or more operations for the user device to perform. The one or more operations may include instructions for at least one of the search application, the OS, and/or a native application on the user device. In response to selection of the AAM, the user device may perform the operations included in the AAM.

A function ID included in a function record may be a string that uniquely identifies the function record among the other function records in the data store. In some examples, the function ID may describe a function and/or an application state in human readable form. For example, the function ID may be a human readable string that describes a function performed according to the AAM and/or an application state resulting from performance of the function according to the AAM. In a more specific example, a function ID for an internet music player application may include the name of the internet music player application along with the name of the song that will be played when the internet music player application is set into the state defined by the AAM included in the function record.

A function record includes ASI. The ASI includes data that describes an application state into which a native application is set according to the AAM in the function record. In some examples, the ASI may include data that describes the function performed according to the AAM included in the function record. The ASI can include text, numbers, and symbols that describe the application state. The types of data included in the ASI may depend on the type of information associated with the application state and the functionality specified by the AAM.

In some examples, the ASI may include data that may be presented to the user when the native application is in the application state defined by the AAM. For example, a function record associated with a shopping application may include ASI that describes products (e.g., names and prices) that are shown when the application is set into the application state defined by the AAM of the function record. As another example, a function record associated with a music player application may include ASI that describes a song (e.g., name and artist) that is played when the application is set into the application state defined by the AAM of the function record.

The ASI included in a function record may be generated in a variety of different ways. In one example, data to be included in the ASI may be retrieved via partnerships with database owners and developers of native applications. For example, the data may be automatically retrieved from online databases that include, but are not limited to, data related to movies, television programs, music, and restaurants. In some examples, some data included in the ASI may be manually generated by a human operator. The data included in the ASI may be updated over time so that the search system provides up-to-date results.

The search system generates search results including a list of AAMs that are included in selected function records. Initially, the search system analyzes the search query received from a user device. The search system then identifies a set of function records based on the received search query. For example, the search system may identify the set of function records based on one or more matches (e.g., text matches) between one or more terms of the search query and one or more terms of the ASI included in the identified function records.

The search system processes (e.g., scores) the identified set of function records. For example, the search system may determine how well the function records match the received search query. The search system may then select the AAMs from the function records that best match the received search query. The search system transmits search results including the selected AAMs to the user device that generated the search query. The search system may also transmit additional data along with the AAMs. For example, the search system may transmit data (e.g., text and/or images) to be included in user selectable links.

In some implementations, a function record (e.g., the function record 220 of FIG. 8A) may include multiple different AAMs. For example, the different AAMs may be associated with different editions of a native application. A native application edition (hereinafter, "application edition") refers to a particular implementation or variation of a native application. For example, an application edition may refer to a version of a native application, such as a version 1.0 of the application, or a version 2.0 of the application. In another example, an application edition may refer to an implementation of a native application for a specific platform, such as a specific OS.

The different AAMs included in the function record may cause the corresponding application editions to launch and perform similar functions. Accordingly, the different AAMs included in the function record may cause the corresponding application editions to be set into similar application states. In one example, if the different AAMs reference different editions of an information retrieval application, the different AAMs may cause the corresponding application editions to retrieve similar information. In another example, if the different AAMs reference different editions of an internet music player application, the different AAMs may cause the corresponding application editions to play the same song.

In a specific example, a function record for a native application that retrieves restaurant information may include multiple different AAMs for multiple different application editions. Assuming the function record is associated with a specific Mexican restaurant, the AAMs for the different application editions may cause each application edition to retrieve information for the same specific Mexican restaurant. For example, a first AAM may cause a first application edition (e.g., on a first OS) to retrieve information for the specific Mexican restaurant. A second AAM may cause a second application edition (e.g., on a second OS) to retrieve information for the specific Mexican restaurant.

During some searches, the search system may identify one or more function records that include multiple AAMs. In these scenarios, the search system may process (e.g., score) the identified set of function records as described above. For each identified function record including multiple AAMs, the search system may select which of the AAMs to transmit to the user device. In some examples, the search system may transmit each AAM of the identified function record to the user device so that the user device may determine which AAM to use. In other examples, the search system may determine which of the multiple AAMs to transmit to the user device based on information included in a query wrapper received from the user device. For example, the search system may select and transmit one or more of the AAMs that are likely to be compatible with the user device, e.g., based on the OS version of the user device.

In some implementations, a function record (e.g., the function record 260 of FIG. 9) may include a web access mechanism (WAM). The WAM may be a resource identifier that can be processed by a wide variety of user devices running different operating systems. In some examples, the WAM may include a uniform resource locator (URL) (i.e., a web address) used with the hypertext transfer protocol (HTTP). For example, the WAM may be a URL that is optimized for a desktop website (e.g., a so-called "full" site) or a mobile device website.

The WAM (e.g., a URL) included in a function record may be used by a web browser to access a web resource that includes similar information and/or performs similar functions as would be performed by a native application that receives an AAM of the function record. In one specific example, the WAM of a function record may direct the web browser of a user device to a web version of the native application referenced in the AAMs of the function record. For example, if the AAMs included in a function record for a specific Mexican restaurant cause each application edition to retrieve information for the specific Mexican restaurant, the WAM may direct the web browser of a user device to a web page entry for the specific Mexican restaurant.

During some searches, the search system may identify one or more function records that include AAMs and a WAM. In these scenarios, the search system may process (e.g., score) the identified set of function records in the manner described above. For each identified function record including AAMs and a WAM, the search system may determine whether to transmit the WAM and the AAMs. In some examples, the search system may transmit the WAM and each of the multiple AAMs to the user device so that the user device can determine which of the access mechanisms to use. In other examples, the search system may determine whether any of the AAMs should be transmitted to the user device. If the search system determines that none of the AAMs is likely to be compatible with the user device, the search system can refrain from sending the AAMs to the user device. Instead, the search system may transmit the WAM to the user device. As described above, the user device may use a web browser to access the web resource identified in the WAM.

In some implementations of the search system, a function record (e.g., the function record 300 of FIG. 11) may include a quality score. The quality score may be a number used by the search system to generate a result score for a function record. For example, the quality score may be a record scoring feature input into one or more machine learned models used to generate a result score, as described hereinafter.

The quality score may be determined based on metrics associated with a person, place, or thing described in the function record. For example, the quality score may be based on the popularity of a place described in the function record and/or ratings (e.g., user ratings) of the place described in the function record. In another example, if the function record describes a song, the quality score may be based on the popularity of the song described in the function record and/or ratings (e.g., user ratings) of the song described in the function record. The quality score may also be determined based on measurements associated with the function record. For example, the quality score may be determined based on data indicating how often the function record is retrieved during a search and how often access mechanisms (e.g., an AAM, a WAM, and/or an application download address) of the function record are selected by a user.

Figure 2:
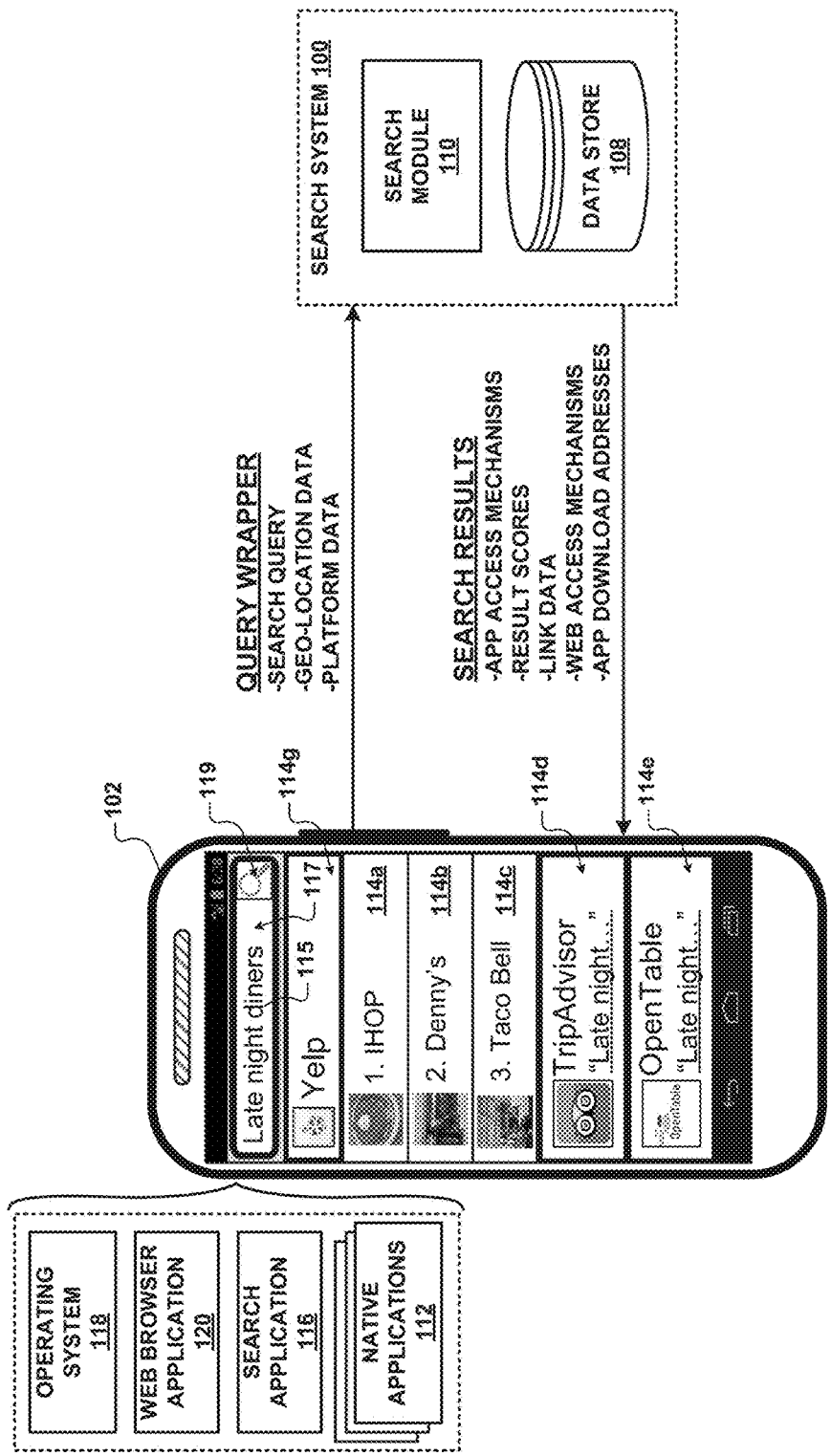
FIG. 2 is a schematic view of an example user device in communication with a search system.

FIG. 1 is a functional block diagram illustrating an example environment including a search system 100 that communicates with user devices 102 and data sources 104 via a network 106. FIG. 2 shows an example user device 102 in communication with the search system 100 via the network 106 (not shown in FIG. 2). The search system 100 is configured to receive a search query from a user device 102 and perform a search for function records included in a data store 108 based on the search query. The function records include AAMs that can be used by a user device 102 to access different functions for a variety of native applications (e.g., the native applications 112 of FIG. 2) installed on the user device 102. The search system 100 transmits search results including a list of AAMs to the user device 102 that generated the search query.

The user device 102 may generate user selectable links based on the received search results (e.g., the links 114a, 114b, . . . , 114e of FIG. 2). Each user selectable link displayed to the user may include an AAM. The user may select a link in the search results on the user device 102. In response to selection of a link, the user device 102 may launch the native application referenced by the AAM and perform the one or more operations indicated in the AAM.

A software application may refer to computer software that causes a computing device to perform a task. In some examples, a software application may be referred to as an "application," an "app," or a "program." Example applications include, but are not limited to, word processing applications, spreadsheet applications, messaging applications, media streaming applications, social networking applications, and games.

Applications can be executed on a variety of different computing devices. For example, applications can be executed on mobile computing devices such as smart phones, tablets, and wearable computing devices (e.g., headsets and/or watches). Applications can also be executed on other types of computing devices having other form factors such as laptop computers, desktop computers, or other consumer electronic devices. In some examples, applications may be installed on a computing device prior to a user purchasing the device. In other examples, the user may download and install applications on the computing device.

The functionality of an application may be accessed on the computing device on which the application is installed. Additionally, or alternatively, the functionality of an application may be accessed via a remote computing device. In some examples, all of an application's functionality is included on the computing device on which the application is installed. These applications may function without communication with other computing devices (e.g., via the Internet). In other examples, an application installed on a computing device may access information from other remote computing devices during operation. For example, a weather application installed on a computing device may access the latest weather information via the Internet and display the accessed weather information to the user through the installed weather application. In still other examples, an application (e.g., a web based application) may be partially executed by the user's computing device and partially executed by a remote computing device. For example, a web application may be an application that is executed, at least in part, by a web server and accessed by a web browser of the user's computing device. Example web applications may include web-based email, online auctions, and online retail sites.

As described above, the search system 100 is configured to receive search queries from one or more user device(s) 102 via a network 106. A search query may include text, numbers, and/or symbols (e.g., punctuation) entered into the user device 102 by the user. For example, with reference to FIG. 2, the user may have entered a search query 115 into a search field (e.g., a search field) 117 of a search application 116 running on the user device 102. The user may have entered the search query 115 using a user interface such as, for example, a touchscreen keypad, a mechanical keypad, and/or via speech recognition. The user may have caused the user device 102 to transmit the search query 115 to the search system 100 by selecting (e.g., touching or clicking) a search button 119 of the search application 116. As described herein, in some examples, the search application 116 may be a native application dedicated to search, or a more general application, such as a web browser application.

In some examples, a user device 102 may transmit additional data along with the search query. The search query and the additional data may be referred to as a query wrapper. The query wrapper may include data associated with the search query, such as geo-location data (e.g., the location of the user device 102), platform data (e.g., a version of an OS 118 of the user device 102, a device type, and a web-browser version), an identity of a user of the user device 102 (e.g., a username), partner specific data, and other data. The user device 102 transmits the query wrapper to the search system 100. The search system 100 can use the search query and/or the additional data included in the query wrapper to generate the search results.

The search system 100 performs a search for function records included in the data store 108 in response to the received search query. The search system 100 generates search results that include a list of AAMs selected from the function records identified during the search. In some examples, the search system 100 generates result scores for the selected AAMs. Each AAM may be associated with a result score that indicates the rank of the AAM relative to the other AAM in the list of AAMs. The search system 100 may transmit the result scores to the user device 102 that generated the search query.

In some examples, the search system 100 may transmit additional data to the user device 102 along with the AAMs and result scores. For example, the search system 100 may transmit link data (e.g., text and/or images). Link data can refer to data that is to be included in user selectable links on the user device 102. The user device 102 displays the user selectable links to the user. Each user selectable link may be associated with an AAM included in the search results such that when a user selects a link, the user device 102 launches the native application referenced in the AAM and sets the native application into the state specified by the AAM. A user may select a link by touching (e.g., tapping) or clicking on the link.

In some examples described herein, the search system 100 may transmit one or more WAMs to the user device 102 along with AAMs. WAMs may include web addresses that are accessible via a web browser application 120 of the user device 102, as shown in FIG. 2. In examples where the search system 100 transmits one or more WAMs, the search system 100 may transmit data (e.g., text and/or images) to be included in user selectable links associated with the WAMs. When a user selects a link associated with a WAM, the user device 102 may launch the web browser application 120 and perform the function indicated in the WAM. The generation of search results including WAMs is described herein with respect to FIG. 9.

FIG. 2 shows an example list of search results that may be displayed to a user on a user device 102. The search results include links 114a, 114b, . . . , 114e (collectively, the "links 114"). Each of the links 114 includes link data. For example, each of the links 114 includes an image (e.g., an application icon) and text (e.g., application name) that describe the native application and the application state (e.g., "IHOP," "Denny's," and "Taco Bell" entries in the native application "YELP," by Yelp, Inc. (hereinafter, "Yelp")). Each of the links 114 may be associated with an AAM such that when the user selects a link, the user device 102 launches the native application and sets the native application into a state that is specified by the AAM associated with the link. As described herein, the links 114 may be arranged for the user based on result scores associated with the AAMs. In some examples, as illustrated in FIG. 2, links for the same native application (e.g., Yelp) may be combined together in the search results displayed to the user. For example, as shown in FIG. 2, the Yelp links 114a, 114b, and 114c are grouped together under a Yelp header 114g. In other examples, links for different native applications may be mixed instead of grouped.

Referring back to FIG. 1, the search system 100 includes a data store 108 and a search module 110. The data store 108 includes one or more different function records, as described herein. Each function record may include data related to a function of a native application and/or the state of the native application resulting from performance of the function. A function record may include a function ID, ASI, and an AAM used to access functionality provided by a native application. The data store 108 may include one or more databases, indices (e.g., inverted indices), tables, files, or other data structures which may be used to implement the techniques of the present disclosure. The search module 110 receives a search query and generates search results based on the data included in the data store 108.

As described above, the search system 100 may communicate with the user devices 102 and the data sources 104 via the network 106. Examples of the user devices 102, the data sources 104, and the network 106 are now described in turn with reference to FIGS. 1-2.

User devices 102 can be any computing devices that are capable of providing search queries to the search system 100. User devices 102 include, but are not limited to, smart phones, tablet computers, laptop computers, and desktop computers. User devices 102 may also include other computing devices having other form factors, such as computing devices included in vehicles, gaming devices, televisions, or other appliances (e.g., networked home automation devices and home appliances).

The user devices 102 may use a variety of different operating systems. In an example where a user device 102 is a mobile device, the user device 102 may run an OS including, but not limited to, ANDROID® developed by Google Inc., IOS® developed by Apple Inc., or WINDOWS PHONE® developed by Microsoft Corporation. Accordingly, the OS 118 running on the user device 102 of FIG. 2 may include one of ANDROID®, IOS®, or WINDOWS PHONE®. In an example where a user device 102 is a laptop or desktop computing device, the user device 102 may run an OS including, but not limited to, MICROSOFT WINDOWS® by Microsoft Corporation, MAC OS® by Apple Inc., or LINUX (LINUX® is the registered trademark of Linus Torvalds in the U.S. and other countries). User devices 102 may also access the search system 100 while running operating systems other than those operating systems described above, whether presently available or developed in the future.

User devices 102 can communicate with the search system 100 via the network 106. In some examples, a user device 102 may communicate with the search system 100 using a native application installed on the user device 102 (e.g., the search application 116). In general, a user device 102 may communicate with the search system 100 using any application that can transmit search queries to the search system 100. In some examples, a user device 102 may run an application that is dedicated to interfacing with the search system 100, such as an application dedicated to searches (e.g., the search application 116). In other examples, a user device 102 may communicate with the search system 100 using a more general application, such as a web-browser application. The application run by a user device 102 to communicate with the search system 100 may display a search field 117 on a graphical user interface (GUI) in which the user may enter search queries. The user may enter a search query using a touchscreen or physical keyboard, a speech-to-text program, or other form of user input.

In general, a search query may be a request for information retrieval (e.g., search results) from the search system 100. For example, a search query may be directed to retrieving a list of links to native application functionality or application states in examples where the search system 100 is configured to generate a list of AAMs as search results. A search query directed to retrieving a list of links to native applications may indicate a user's desire to access functionality of one or more native applications described by the search query.

A user device 102 may receive a set of search results from the search system 100 that are responsive to the search query transmitted to the search system 100. The user device 102 may run a search application 116 including a GUI that displays the search results received from the search system 100. For example, the search application 116 used to transmit the search query to the search system 100 may also display the received search results to the user.

The GUI of the search application 116 running on the user device 102 may display the search results to the user in a variety of different ways, depending on what information is transmitted to the user device 102. In examples where the search results include a list of AAMs, the search system 100 may transmit the list of AAMs to the user device 102 along with additional data to be displayed in user selectable links. In some examples, the GUI may display the search results to the user as a list of user selectable links including text and images. The text and images in the links may include the native application names associated with the AAMs, text describing the AAMs, images associated with the native application referenced by the AAMs (e.g., application icons), and images associated with the application states (e.g., application screen images) defined by the AAMs.

In some examples, the GUI may display the search results as a list of links (e.g., links 114 of FIG. 2) arranged under the search field (e.g., the search field 117 of FIG. 2) in which the user entered the search query. The user device 102 may arrange the links in order by result scores associated with the links. In other words, the user device 102 may arrange the links in order by the result scores associated with the AAMs included in the links. In some examples, the user device 102 may group the links together if the links are related to a same native application.

In some examples, user devices 102 may communicate with the search system 100 via a partner computing system (not illustrated). The partner computing system may be a computing system of a third party that may leverage the search functionality of the search system 100. The partner computing system may belong to a company or organization other than that which operates the search system 100. Example third parties which may leverage the functionality of the search system 100 may include, but are not limited to, internet search providers and wireless communications service providers. The user devices 102 may send search queries to the search system 100 and receive search results via the partner computing system. The partner computing system may provide a user interface to the user devices 102 in some examples and/or modify the search experience provided on the user devices 102.

FIG. 1 shows a plurality of data sources 104. The data sources 104 may be sources of data which the search system 100 may use to generate and update the data store 108. For example, the search system 100 may use the data to update one or more databases, indices, tables, files, or other data structures included in the data store 108. The search system 100 may generate new function records and update existing function records based on data retrieved from the data sources 104. Although not illustrated in FIG. 1, the search system 100 may include modules that generate new function records and update existing function records based on the data retrieved from the data sources 104. In some examples, some data included in the data store 108 may be manually generated by a human operator.

The data sources 104 may include a variety of different data providers. The data sources 104 may include data from application developers, such as application developers' websites and data feeds provided by developers. The data sources 104 may include operators of digital distribution platforms configured to distribute applications to user devices 102. The data sources 104 may also include other websites, such as websites that include web logs (i.e., blogs), application review websites, or other websites including data related to applications. Additionally, the data sources 104 may include social networking sites, such as "FACEBOOK®" by Facebook, Inc. (e.g., Facebook posts) and "TWITTER®)" by Twitter, Inc. (e.g., text from tweets). The data sources 104 may also include online databases that include, but are not limited to, data related to movies, television programs, music, and restaurants. The data sources 104 may also include additional types of data sources in addition to the data sources described above. Different data sources may have their own content and update rate.

The search system 100 retrieves data from one or more of the data sources 104. The data retrieved from the data sources 104 can include any type of data related to application functionality and/or states. The search system 100 generates function records based on the data retrieved from the data sources 104. In some examples, some data included in the function records (e.g., ASI) is manually generated by a human operator. The data included in the function records may be updated over time so that the search system 100 provides up-to-date results.

As described above, the user devices 102, the search system 100, and the data sources 104 may be in communication with one another via the network 106. The network 106 may include various types of networks, such as a wide area network (WAN) and/or the Internet. Although the network 106 may represent a long range network (e.g., Internet or WAN), in some implementations, the network 106 may include a shorter range network, such as a local area network (LAN). In some implementations, the network 106 uses standard communications technologies and/or protocols. Thus, the network 106 can include links using technologies such as Ethernet, Wireless Fidelity (WiFi) (e.g., 802.11), worldwide interoperability for microwave access (WiMAX), 3G, Long Term Evolution (LTE), digital subscriber line (DSL), asynchronous transfer mode (ATM), InfiniBand, PCI Express Advanced Switching, etc. Similarly, the networking protocols used on the network 106 can include multiprotocol label switching (MPLS), the transmission control protocol/Internet protocol (TCP/IP), the User Datagram Protocol (UDP), HTTP, the simple mail transfer protocol (SMTP), the file transfer protocol (FTP), etc. The data exchanged over the network 106 can be represented using technologies and/or formats including the hypertext markup language (HTML), the extensible markup language (XML), etc. In addition, all or some of the links can be encrypted using conventional encryption technologies such as secure sockets layer (SSL), transport layer security (TLS), virtual private networks (VPNs), Internet Protocol security (IPsec), etc. In other examples, the network 106 can use custom and/or dedicated data communications technologies instead of, or in addition to, the ones described above.

Figure 3A:
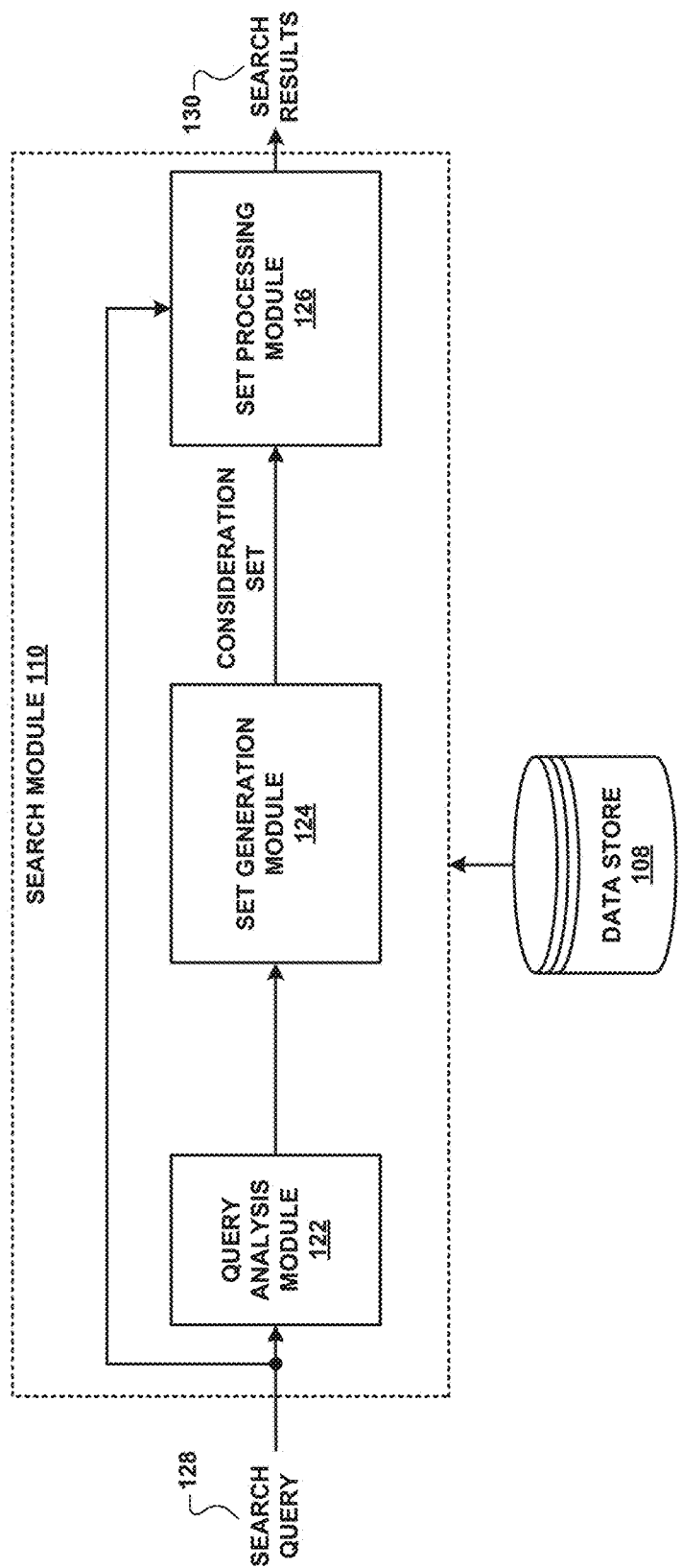
FIG. 3A is a functional block diagram of an example search module.

FIG. 3A shows an example search module 110 which may be included in the search system 100. The search module 110 includes a query analysis module 122, a consideration set generation module 124 (hereinafter, the "set generation module 124"), and a consideration set processing module 126 (hereinafter, the "set processing module 126"). The query analysis module 122 receives a query wrapper including a search query 128. The query analysis module 122 analyzes the received search query 128. The set generation module 124 identifies a set of function records based on the received search query 128. The identified set of function records may be referred to herein as a "consideration set." The set processing module 126 processes (e.g., scores) the consideration set to generate a set of search results 130 that include a list of AAMs selected from the function records of the consideration set.

Figure 3C:
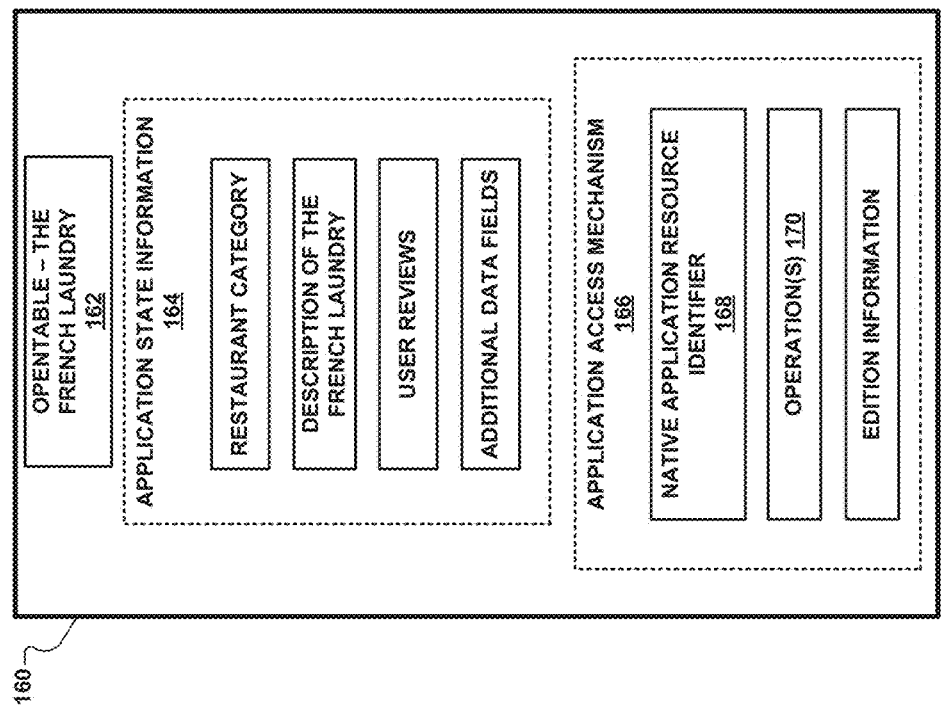
FIGS. 3B-3C are schematic views of example function records.
Figure 3B:
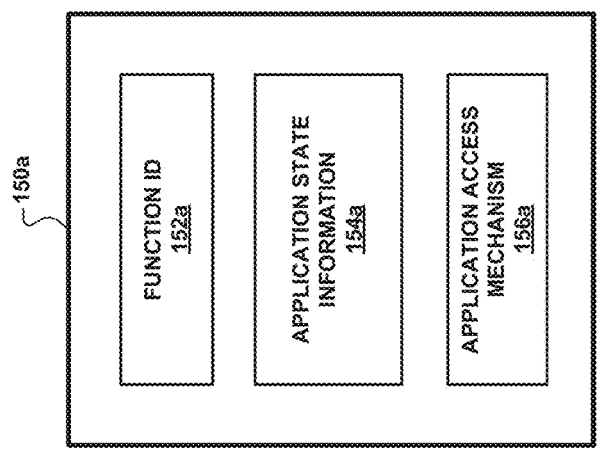

Referring now to FIG. 3B, an example function record 150a includes a function ID 152a, ASI 154a, and a native AAM 156a (hereinafter, the "AAM 156a"). The function record 150a may include data related to a function of a native application and/or the state of the native application resulting from performance of the function. The data store 108 may include a plurality of function records each having a similar structure as the function record 150a. Put another way, the data store 108 may include a plurality of function records each having a function ID 152a, ASI 154a, and an AAM 156a.

The function ID 152a may be used to identify the function record 150a among other function records 150a included in the data store 108. The function ID 152a may be a string of alphabetic, numeric, and/or symbolic characters (e.g., punctuation marks) that uniquely identify the function record 150a in which the function ID 152a is included. In some examples, the function ID 152a may describe a function and/or an application state in human readable form. For example, the function ID 152a may include the name of the native application referenced in the AAM 156a. Additionally, or alternatively, the function ID 152a may be a human readable string that describes a function performed according to the AAM and/or an application state resulting from performance of the function according to the AAM. In some examples, the function ID 152a may include a string in the format of a URL of a WAM for the function record 150a, which may uniquely identify the function record, as described with respect to FIG. 9.

In a more specific example, if the function record 150a describes a function of the native application Yelp, the function ID 152a may include the name "Yelp" along with a description of the application state described in the ASI 154a. For example, the function ID 152a for a function record that describes the restaurant "The French Laundry®" (hereinafter, "The French Laundry") may be "Yelp—The French Laundry." In an example where the function ID 152a includes a string in the format of a URL, the function ID 152a may include the following string "www.yelp.com/biz/the-french-laundry-yountville-2?ob=1" to uniquely identify the function record 150a.

The ASI 154a may include data that describes an application state into which a native application is set according to the AAM 156a included in the function record 150a. Additionally, or alternatively, the ASI 154a may include data that describes the function performed according to the AAM 156a included in the function record 150a. The ASI 154a may include a variety of different types of data. For example, the ASI 154a may include structured, semi-structured, and/or unstructured data. The ASI 154a may be extracted or inferred from documents retrieved from the data sources 104. In some examples, the ASI 154a may include data that is manually generated. The ASI 154a may be updated so that up-to-date search results can be provided in response to a user search query.

In some examples, the ASI 154a may include data that may be presented to the user when the native application is in the application state defined by the AAM 156a. For example, the ASI 154a may include data that describes a state of the native application after the user device 102 has performed the one or more operations indicated in the AAM 156a. In one example, if the function record 150a is associated with a shopping application, the ASI 154a may include data that describes products (e.g., names and prices)

that are shown when the shopping application is set to the application state defined by the AAM 156a of the function record 150a. As another example, if the function record 150a is associated with a music player application, the ASI 154a may include data that describes a song (e.g., name and artist) that is played when the music player application is set to the application state defined by the AAM 156a of the function record 150a.

The types of data included in the ASI 154a may depend on the type of information associated with the application state and the functionality defined by the AAM 156a. In one example, if the function record 150a is for a native application that provides reviews of restaurants, the ASI 154a may include information (e.g., text and numbers) related to a restaurant, such as a category of the restaurant, reviews of the restaurant, and a menu for the restaurant. In this example, the AAM 156a may cause the native application to launch and retrieve information for the restaurant. As another example, if the function record 150a is for a native application that plays music, the ASI 154a may include information related to a song, such as the name of the song, the artist, lyrics, and listener reviews. In this example, the AAM 156a may cause the native application to launch and play the song described in the ASI 154a.

The AAM 156a may include an ARI and/or one or more operations for a user device 102 to perform. For example, an ARI may be a string having an application specific scheme. The ARI may include a reference to a native application and indicate one or more operations for the user device 102 (e.g., the native application) to perform. For example, the ARI may include a reference to a native application, a domain name, and a path to be used by the native application to retrieve and display information to the user.

An example ARI for the native application "OPENTABLE®" by OpenTable, Inc. (hereinafter, "OpenTable") on the ANDROID® OS is "vnd.opentable.deeplink://opentable.com/restaurant/profile?rid=88333&refid=1." A portion of the example ARI references the OpenTable native application. For example, the substring "vnd.opentable.deeplink" of the ARI references the OpenTable native application. The example ARI also indicates one or more operations for the OpenTable native application to perform. For example, the OpenTable native application may retrieve and display the information included in the ARI domain and path defined by the substring "opentable.com/restaurant/profile?rid=88333&refid=1." In response to receiving the ARI, a user device 102 may launch the OpenTable native application and display information retrieved from the location indicated in the ARI. The ARI may be provided by an app developer, for example.

In some examples, the AAM 156a may include operations for the user device 102 to perform in addition to the operation(s) indicated in the ARI. For example, the search application 116 on the user device 102, the OS 118 of the user device 102, and/or a native application installed on the user device 102 may perform the operations included in the AAM 156a in order to set the native application into an application state specified by the AAM 156a. In some examples, the operations may be included in a script. Examples of operations may include, but are not limited to, launching a native application, waiting for the native application to start, creating and sending a search request to a server associated with the native application, setting a current geo-location in a native application, making a restaurant reservation, sending a text message, and adding an appointment to a calendar.

In some examples, the AAM 156a may not include an ARI. Instead, the AAM 156a can include one or more other operations that reference a native application. The operations may be performed by the user device 102. The operations may include instructions for at least one of the search application 116, the OS 118, and a native application on the user device 102. In response to selection of the AAM 156a, the user device 102 may perform the operations included in the AAM 156a. In some examples, the operations may be included in a script.

The AAM 156a may also include edition information that indicates the native application edition with which the AAM 156a is compatible. For example, the edition information may indicate the OS with which the AAM 156a is compatible. In some examples, the search system 100 can determine whether to transmit the AAM 156a in the search results based on whether the user device 102 (e.g., the OS 118) can handle the AAM 156a. As one example, the search system 100 may transmit the edition information for the AAM 156a to the user device 102. In the event the user device 102 does not include the native application edition (e.g., for a particular OS) with which the AAM 156a is compatible, the user device 102 may not display a user selectable link for the AAM 156a. In some examples, e.g., in instances where none of the AAM(s) of the function record 150a is compatible with the user device 102 but where the function record 150a also includes a WAM, the user device 102 may instead display a user selectable link for the WAM. In other examples, in cases where the user device 102 does not include the native application edition with which the AAM 156a is compatible, the user device 102 may display a download and install user selectable link for the native application edition to the user. Upon the user selecting the link, the user device 102 may download and install the native application edition, launch the native application edition, and set the native application edition into an application state specified by the AAM 156.

In some examples, an ARI is an application specific resource identifier that is defined by the developer of the application. In this example, the search application 116 receives the ARI and the OS 118 may send the ARI to the native application referenced in the ARI. The native application referenced in the ARI launches and is set into the state specified by the ARI.

In some examples, a native application function may not be accessible using an ARI. For example, a function of the native application may not include a corresponding ARI that the application may use to perform the function. As another example, some native applications may not be configured to receive ARIs. In these examples, an AAM for the native application can include one or more operations that cause the native application to perform the function that may not otherwise be accessible using an ARI. For example, the search application 116 may receive the one or more operations and execute the one or more operations to set the native application into the desired application state. In a specific example, the one or more operations may include launching the native application along with additional operations for the native application to perform. For example, the search application 116 may initially trigger the native application to start the application, and then wait for a period of time for the native application to start. Then the search application 116 may perform additional operations included in the received AAM, such as issuing a search instruction to the native application.

In still other examples, a native application may be configured to directly receive the operations transmitted by the search system 100. In these examples, the native application may be launched according to the AAM and then the launched native application may directly perform the operations received from the search system 100.

A single native application can provide a variety of different functionalities. For example, a restaurant reservation application can access reviews for a variety of different restaurants and set up reservations at a variety of different restaurants. Similarly, a travel application can book hotels, book flights, and provide reviews for different travel destinations. The different functionalities associated with a single native application may be accessed using a plurality of different AAMs. For example, with respect to the restaurant reservation application, the data store 108 may include function records having different AAMs for accessing different restaurant reviews and setting up reservations. Similarly, the data store 108 may include function records having different AAMs for booking hotels, booking flights, and accessing reviews for different travel destinations.

The AAMs for a single native application may vary in complexity. In some examples, the AAMs may cause a native application to launch (e.g., the OS 118 may be instructed to launch the application) and then perform additional operations after launching, as described above. In other examples, the AAMs may cause a native application to launch into a default state (e.g., a default homepage) without performing any additional operations. A function record including an AAM that causes a native application to launch into a default state may be thought of as an access mechanism that is related to the native application, but not to any particular state which may be accessed by the application. A function record including such an AAM may include ASI describing the native application, instead of any particular application state. For example, the ASI may include the name of the developer of the application, the publisher of the application, a category (e.g., genre) of the application, a description of the application (e.g., a developer's description), and the price of the application. The ASI may also include security or privacy data about the application, battery usage of the application, and bandwidth usage of the application. The ASI may also include application statistics. Application statistics may refer to numerical data related to a native application. For example, application statistics may include, but are not limited to, a number of downloads, a download rate (e.g., downloads per month), a number of ratings, and a number of reviews.

FIG. 3C shows an example function record 160 associated with the native application OpenTable. OpenTable is a restaurant-reservation application that allows users to search for restaurants and make restaurant reservations. OpenTable provides information about restaurants, including descriptions of restaurants and user reviews of the restaurants. The example function record 160 of FIG. 3C describes an application state of OpenTable in which OpenTable accesses information for the restaurant The French Laundry.

The function record 160 includes the function ID "Opentable—The French Laundry" indicated at 162, which may uniquely identify the function record 160. In other examples, the function ID 162 could include a URL as a unique identifier for the function record 160. For example, the function ID 162 may include the string "http://www.opentable.com/the-french-laundry" as a unique identifier for the function record 160. Such a function ID may be included in a WAM of a function record. In another example, the function ID could be a string of characters, numbers, and/or symbols that are not in human readable form.

The function record 160 includes ASI 164. The ASI 164 includes a data fields for restaurant category of the French Laundry, description of the French Laundry, user reviews of the French Laundry, and additional data fields. The restaurant category field may include the text "French cuisine" and "contemporary," for example. The description field for The French Laundry may include text that describes The French Laundry. The user reviews field may include text of user reviews for The French Laundry. The additional data fields may include additional data for The French Laundry that may not specifically fit within the other defined fields, such as a menu for the restaurant, prices, and operating hours for the restaurant.

The function record 160 includes an AAM 166. The AAM 166 may include a reference to the native application OpenTable along with one or more operations to be performed by a user device 102. For example, the AAM 166 may include a native ARI 168 and/or one or more operations 170 that cause the user device 102 to access the entry for The French Laundry in the OpenTable native application. An example ARI 168 may be "vnd.opentable.deeplink://opentable.com/restaurant/profile?rid=1180&refid=1."

Referring back to FIG. 3A, the search query 128 received by the search module 110 is used to perform a search of the data store 108. The query analysis module 122 receives the search query 128. The query analysis module 122 may perform various analysis operations on the received search query 128. For example, analysis operations performed by the query analysis module 122 may include, but are not limited to, tokenization of the search query 128, filtering of the search query 128, stemming, synonymization, and stop word removal.

The set generation module 124 identifies a set of function records (i.e., the consideration set) based on the search query 128. In some examples, the set generation module 124 may identify the set of function records based on matches between terms of the search query 128 and terms in the function records. For example, the set generation module 124 may identify a set of function records in the data store 108 based on matches between tokens generated by the query analysis module 122 and words included in the function records, such as words included in the ASI and/or function IDs of the function records.

The set processing module 126 processes the consideration set to generate a set of search results 130 that includes a list of AAMs. In some examples, the set processing module 126 scores the functions records included in the consideration set. The scores associated with the function records may be referred to as "result scores." Accordingly, in some examples, each of the function records in the consideration set may have a corresponding result score. The set processing module 126 may then select function records from the consideration set based on the result scores associated with the function records. For example, the set processing module 126 may select the highest scoring function records of the consideration set.

The set processing module 126 selects AAMs from the selected function records (e.g., the highest scoring function records). The set processing module 126 transmits the selected AAMs to the user device 102 that generated the search query 128. The set processing module 126 may also transmit the result scores associated with the AAMs. For example, an AAM may be associated with the result score of the function record from which the AAM was selected.

The information conveyed by the search results 130 may depend on how the result scores are calculated by the set processing module 126. For example, the result scores may indicate the relevance of an application function or state to the search query 128, the popularity of an application function or state, or other properties of the application function or state, depending on what parameters the set processing module 126 uses to score the function records.

The set processing module 126 may generate result scores for function records in a variety of different ways. In some implementations, the set processing module 126 generates a result score for a function record based on one or more scoring features. The scoring features may be associated with the function record and/or the search query 128. A function record scoring feature (hereinafter, "record scoring feature") may be based on any data associated with a function record. For example, record scoring features may be based on any data included in the ASI of the function record. Example record scoring features may be a quality score and whether the function record includes an AAM that leads to a default state or a deeper native application state. A query scoring feature may include any data associated with the search query 128. For example, query scoring features may include, but are not limited to, a number of words in the search query 128, the popularity of the search query 128, and the expected frequency of the words in the search query 128. A record-query scoring feature may include any data which may be generated based on data associated with both the function record and the search query 128 that resulted in identification of the function record by the set generation module 124. For example, record-query scoring features may include, but are not limited to, parameters that indicate how well the terms of the search query 128 match the terms of the ASI of the identified function record. The set processing module 126 may generate a result score for a function record based on at least one of the record scoring features, the query scoring features, and the record-query scoring features.

The set processing module 126 may determine a result score based on one or more of the scoring features listed herein and/or additional scoring features not explicitly listed. In some examples, the set processing module 126 may include one or more machine learned models (e.g., a supervised learning model) configured to receive one or more scoring features. The one or more machine learned models may generate result scores based on at least one of the record scoring features, the query scoring features, and the record-query scoring features. For example, the set processing module 126 may pair the search query 128 with each function record and calculate a vector of features for each (query, record) pair. The vector of features may include one or more record scoring features, one or more query scoring features, and one or more record-query scoring features. The set processing module 126 may then input the vector of features into a machine-learned regression model to calculate a result score for the function record. In some examples, the machine-learned regression model may include a set of decision trees (e.g., gradient boosted decision trees). In another example, the machine-learned regression model may include a logistic probability formula. In some examples, the machine learned task described above can be framed as a semi-supervised learning task, where a minority of the training data is labeled with human curated scores and the rest of the data is used without human labels.

The result scores associated with the AAMs may be used in a variety of different ways. In some examples, the result scores associates with AAMs may be used to rank the list of AAMs. In these examples, a higher result score may indicate that the AAM (e.g., the function or application state) is more relevant to a user than an AAM having a smaller result score.

In examples where the search results 130 are displayed as a list on a user device 102, the links for AAMs associated with larger result scores may be listed closer to the top of the results list (e.g., near to the top of the screen). In these examples, links for AAMs having lower result scores may be located farther down the list (e.g., off screen) and may be accessed by scrolling down the screen of the user device 102. In some examples, as illustrated in FIG. 2, the user device 102 may group together the links associated with the same native application.

FIG. 4A is a functional block diagram of another example of the search module 110 described above with reference to FIG. 3A. Like the search module 110 of FIG. 3A, the search module 110 of FIG. 4A also includes the query analysis module 122, the set generation module 124, and the set processing module 126. In the example of FIG. 4A, the query analysis module 122 receives a query wrapper that includes a search query 128 from one of the user device(s) 102 and analyzes the received search query 128. Also in this example, the set generation module 124 identifies a consideration set of one or more function records (e.g., the function record 150b or 150c of FIGS. 4B-4C) included in the data store 108 based on the received search query 128. For example, the set generation module 124 may identify the function records of the consideration set based on matches between terms of function IDs and/or ASI included in the function records and terms of the received search query 128. In the example of FIG. 4A, the set generation module 124 retrieves one or more function IDs that correspond to the identified function records of the consideration set from the data store 108. In this example, the consideration set includes the function ID(s) of the identified function records, rather than the function records themselves. In other examples, the set generation module 124 may retrieve the function records of the consideration set from the data store 108 in their entirety. In these examples, the consideration set may include the function records. In any case, as described in greater detail below, the set processing module 126 processes (e.g., scores) the consideration set to generate search results 130 that include one or more access mechanisms (e.g., AAMs, WAMs, and application download addresses) selected from the function records of the consideration set.

As shown in FIG. 4A, the set processing module 126 includes a scoring module 132 and a result generation module 134. In the example of FIG. 4A, the scoring module 132 receives the consideration set from the set generation module 124. In this example, the scoring module 132 receives the function ID(s) that correspond to the function records of the consideration set from the set generation module 124. In other examples, the scoring module 132 may receive the function records of the consideration set in their entirety, as described above. Also in this example, the scoring module 132 receives one or more quality scores associated with the function records of the consideration set. Specifically, as shown in FIG. 4A, the scoring module 132 retrieves the quality scores from the data store 108. In some examples, the quality scores may be included in the function records of the consideration set. In other examples, the quality scores may be stored in other data structures included in the data store 108. The scoring module 132 scores the function records of the consideration set using the quality scores in the manner described above with reference to FIG. 3A. As shown in FIG. 4A, upon scoring the function records of the consideration set, the scoring module 132 generates one or more scored function IDs that correspond to the scored function records and transmits the scored function ID(s) to the result generation module 134, which is described in greater detail below.

As also shown in FIG. 4A, the result generation module 134 receives the scored function ID(s) that correspond to the scored function records of the consideration set from the scoring module 132. The result generation module 134 then generates the search results 130 that include the access mechanisms (e.g., AAMs, WAMs, and application download addresses) selected from the scored function records. As one example, the result generation module 134 may identify the scored function records in the data store 108 using the received scored function ID(s). The result generation module 134 may then select one or more access mechanisms from the identified scored function records and transmit some or all of the access mechanisms as the search results 130 to the user device 102. As another example, the result generation module 134 may identify one or more access tables (e.g., the access table 174 of FIG. 4D) in the data store 108, or in another data store, using the received scored function ID(s). The result generation module 134 may then select one or more access mechanisms from the identified access tables and transmit some or all of the access mechanisms as the search results 130 to the user device 102. The result generation module 134 may also retrieve link data associated with the access mechanisms and transmit the link data to the user device 102 along with the search results 130. For example, the link data may be stored in the scored function records, or in other data structures included in the data store 108, or in another data store. The user device 102 may use the link data to generate one or more user selectable links for the access mechanisms.

FIGS. 4B-4C illustrate other example function records 150b and 150c that may be included in the data store 108 of the search system 100. Specifically, the search module 110 of FIG. 4A may use the function records 150b and 150c to generate the search results 130 in response to receiving the search query 128 from the user device 102, as described above with reference to FIG. 4A. As shown in FIG. 4B, the function record 150b includes a function ID 152b and ASI 154b. As shown in FIG. 4C, the function record 150c includes a function ID 152c, ASI 154c, and link data 158. The function records 150b and 150c include data that is similar to that of the function record 150a described above with respect to FIG. 3B. In contrast to the function record 150a, the function records 150b and 150c do not include access mechanisms (e.g., AAMs, WAMs, or application download addresses). Instead, the access mechanisms that correspond the function records 150b and 150c are included in access tables (e.g., the access table 174), which are described below with respect to FIGS. 4D-4E.

Referring again to FIG. 4A, the set generation module 124 may identify the consideration set based on the received search query 128 such that the consideration set includes one of the function records 150b and 150c. For example, the set generation module 124 may identify the function record 150b or 150c based on matches between terms of the function ID 152b or 152c and/or ASI 154b or 154c and terms of the received search query 128, as described above. As explained below with reference to FIGS. 4D-4E, the set processing module 126 processes (e.g., scores) the consideration set including the function record 150b or 150c and generates the search results 130 that include one or more access mechanisms (e.g., AAMs, WAMs, and application download addresses) selected from one or more access tables (e.g., the access table 174 of FIG. 4D) that are associated with the function record 150b or 150c.

FIGS. 4D-4E illustrate example access tables 174 and 184 that may be included in the data store 108 of the search system 100. Specifically, the search module 110 of FIG. 4A may use each of the access tables 174 and 184 along with a function record (e.g., the function record 150b or 150c) associated with the respective access table to generate search results 130 in response to receiving a search query 128, as described above with reference to FIGS. 4A-4C.

As explained herein, the data store 108 may include one or more databases, indices (e.g., inverted indices), tables, files, or other data structures which may be used to implement the disclosed techniques. In some examples, the data store 108 may also include one or more access tables that each include one or more different access mechanisms (e.g., one or more AAMs, WAMs, and application download addresses). For example, the access table 174 of FIG. 4D includes a function ID 176, AAMs 1-N 178, WAMs I-M 180, and application download addresses 1-P 182, where N, M, and P each represent an integer value that is greater than or equal to 1. The function ID 176 may serve as a unique identifier for the access table 174 and associate the access table 174 with a function record included in the data store 108 and having the same function ID. In this example, in response to receiving a search query 128 from a user device 102, the search system 100 may identify and score a consideration set of one or more function records, as described above. The consideration set may include a function record that has the function ID 176. The search system 100 may identify the access table 174 using the function ID 176 of the identified function record and select one or more access mechanisms (e.g., AAM(s), WAM(s), and/or application download addresses) from the access table 174. The search system 100 may transmit the access mechanisms to the user device 102.

The access table 184 of FIG. 4E represents a specific example of the access table 174 of FIG. 4D for a function record having a function ID 186 "http://www.yelp.com/search?find_desc=dentists." As shown in FIG. 4E, the access table 184 includes multiple AAMs 188a-188c, multiple WAMs 190a-190b, and multiple application download addresses 192a-192c. In the example of FIG. 4E, the AAMs 188a-188c correspond to AAMs for the ANDROID® OS, the IOS® OS, and the WINDOWS PHONE® OS, respectively. Also in this example, the WAMs 190a-190b correspond to WAMs for the desktop and mobile web-based application versions of Yelp, respectively. Additionally, the application download addresses 192a-192c shown in FIG. 4D correspond to application download addresses for the native application versions of Yelp provided by the GOOGLE PLAY®, ITUNES®, and WINDOWS PHONE® digital distribution platforms, respectively.

Figure 5:
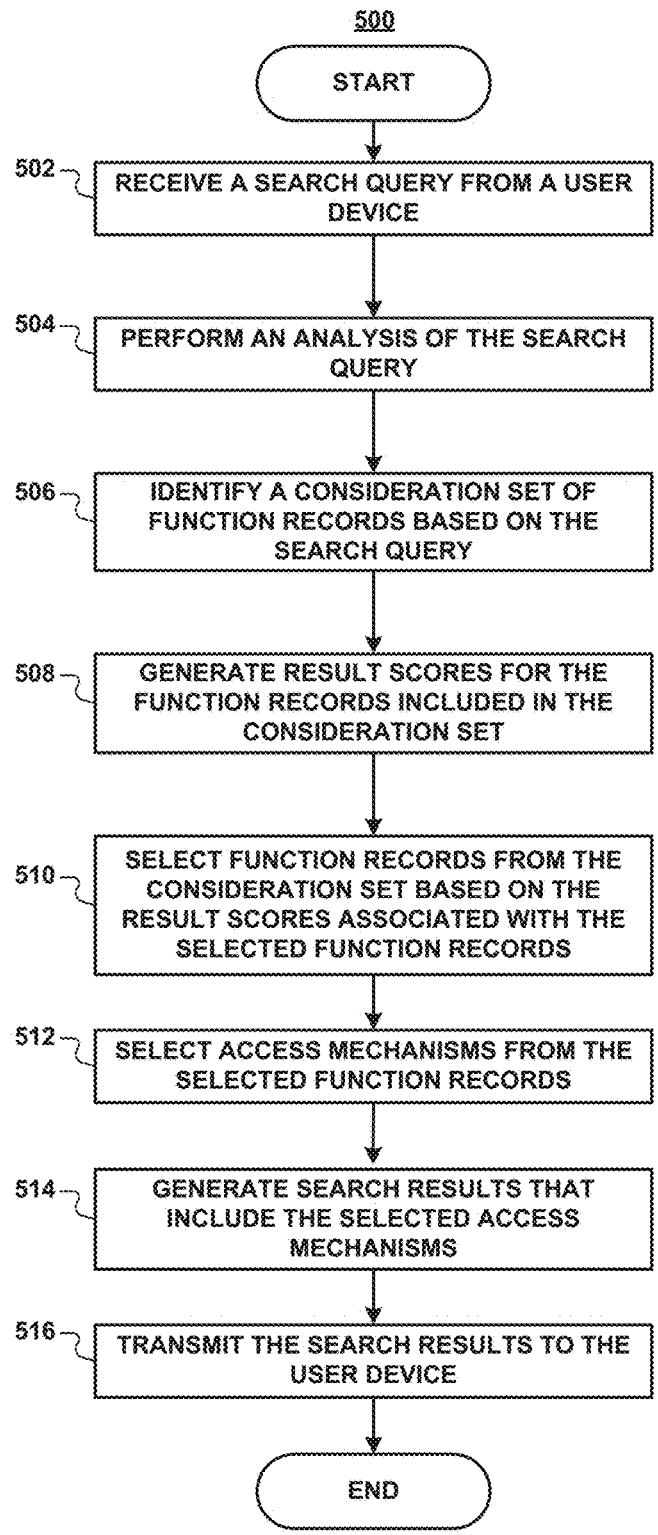
FIG. 5 is a flow diagram of an example method for performing a search for function records based on a search query received from a user device.

FIG. 5 shows an example method 500 for performing a search for function records (e.g., any of the function records 150a-150c, 220, 260, 280, and 300 described with reference to FIGS. 3B, 4B, 4C, 8A, and 9-11) based on a search query 128 received from a user device 102. The method 500 is described with reference to the search module 110 of FIGS. 3A and 4A and the various components thereof. In block 502, the query analysis module 122 receives a search query 128 from (e.g., generated by) a user device 102. For example, a user of the user device 102 may have entered the search query 128 into a GUI of a search application 116 included on the user device 102. The user may have then caused the user device 102 to transmit the search query 128 to the query analysis module 122 by interacting with the GUI. In block 504, the query analysis module 122 performs an analysis of the search query 128. For example, the query analysis module 122 may perform one or more of tokenization, filtering, stemming, synonymization, and stop word removal with respect to the search query 128.

In block 506, the set generation module 124 identifies a consideration set of one or more function records included in the data store 108 based on the search query 128 (e.g., based on an output of the query analysis module 122). In blocks 508-510, the set processing module 126 processes the consideration set of function records. Specifically, in block 508, the set processing module 126 generates one or more result scores for the function records included in the consideration set. For example, the set processing module 126 may generate a result score for each function record included in the consideration set. In block 510, the set processing module 126 selects one or more function records from the consideration set based on the result scores associated with the selected function records. For example, the set processing module 126 may select one or more function records having the highest (e.g., largest) result scores.

In block 512, the set processing module 126 selects one or more AMs from the selected function records. For example, the set processing module 126 may select one or more AAMs, WAMs, and/or application download addresses from each of the selected function records. In block 514, the set processing module 126 generates search results 130 that include the selected AMs. For example, the set processing module 126 may generate the search results 130 such that the search results 130 include one or more of the AMs selected from each selected function record. In block 516, the set processing module 126 transmits the search results 130 to the user device 102 that generated the search query 128.

Figure 6:
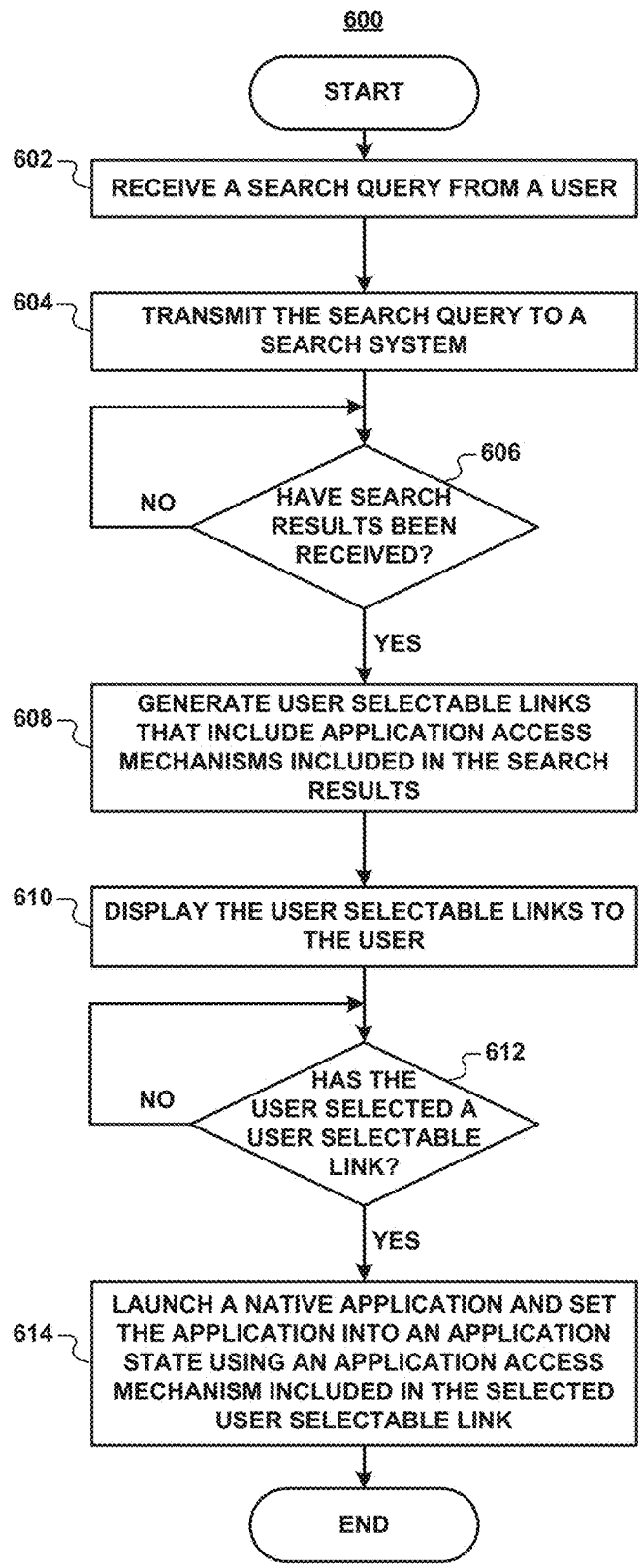
FIG. 6 is a flow diagram of an example method describing operation of a user device.

FIG. 6 shows an example method 600 describing operation of one of the user devices 102. It may be assumed that the user device 102 described according to the method 600 includes a search application 116 (e.g., a native application, or web browser implementation) that is configured to communicate with the search system 100. It may also be assumed that the search application 116 running on the user device 102 generates a GUI that receives search queries 128 from users of the user device 102, and displays search results 130 received by the user device 102 from the search system 100 in response to the user device 100 transmitting the search queries 128 to the search system 100. The method 600 is described with reference to the search system 100 and one of the user devices 102 of FIGS. 1-2, and the various components thereof.

In block 602, the search application 116 receives a search query 128 from a user of the user device 102. For example, the user may have entered the search query 128 into the GUI (e.g., into a search field of the GUI) of the search application 116. In block 604, the user device 102 transmits the search query 128 to the search system 100. For example, the user may have caused the user device 102 to transmit the search query 128 to the search system 100 by selecting (e.g., touching, or clicking on) a search button included in the GUI. In block 606, the user device 102 waits to receive search results 130 that are responsive to the search query 128 from the search system 100. The method 600 continues in block 608 when the user device 102 receives the search results 130 from the search system 100 in response to transmitting the search query 128 to the search system 100. As described herein, the search results 130 received by the user device 102 from the search system 100 may include one or more AAMs that each reference a native application and indicate one or more operations for the application to perform. In some examples, the search results 130 may further include one or more WAMs and/or application download addresses. The search results 130 may also include one or more result scores associated with the AAMs, as also described herein. Additionally, the search results 130 may include link data (e.g., text and/or images) for each of the AAMs, as further described herein. As described in greater detail below, the search application 116 may generate one or more user selectable links for the AAMs included in the search results 130 using the received link data, and display the links to the user within the GUI (e.g., by arranging the links within a list using the corresponding received results scores).

Accordingly, in block 608, the search application 116 generates one or more user selectable links that include the AAMs included in the search results 130 (e.g., using link data received from the search system 100 as part of the search results 130). For example, the search application 116 may generate one user selectable link for each AAM included in the search results 130. In block 610, the search application 116 displays the user selectable links to the user. For example, the search application 116 may arrange the user selectable links within a list (e.g., using result scores received from the search system 100 as part of the search results 130), and display the list within the GUI of the search application 116. In block 612, the search application 116 waits for the user to select one of the user selectable links displayed to the user via the GUI. The method 600 continues in block 614 when the user selects (e.g., touches, or clicks on) one of the user selectable links. In block 614, in response to the user selecting one of the user selectable links, the user device 102 launches the native application referenced by the AAM included in the selected user selectable link on the user device 102, and sets the launched application into an application state specified by the AAM using the AAM. For example, to set the native application into the application state, the user device 102 may cause the application to perform the one or more operations indicated by the AAM.

Figure 7B:
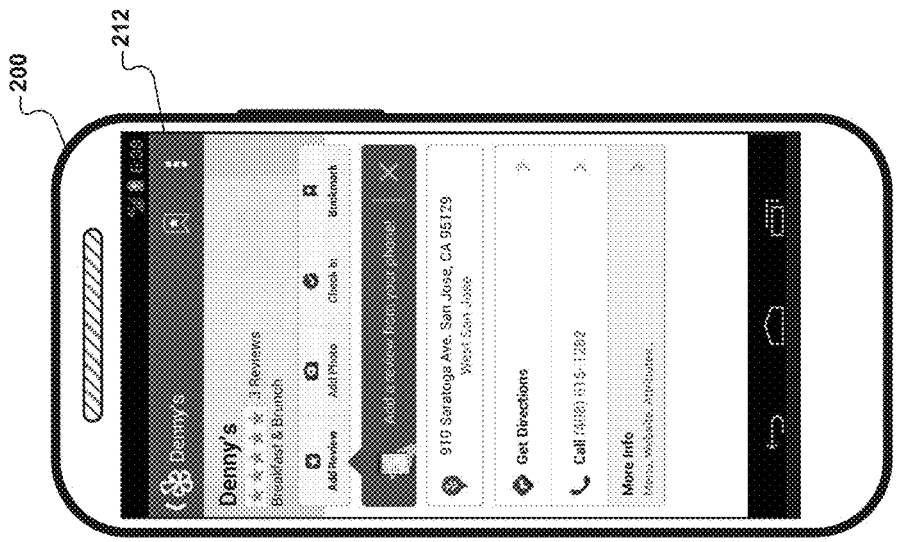
FIGS. 7A-7B are schematic views of example graphical user interfaces (GUIs) that may be generated on a user device according to the present disclosure.
Figure 7A:
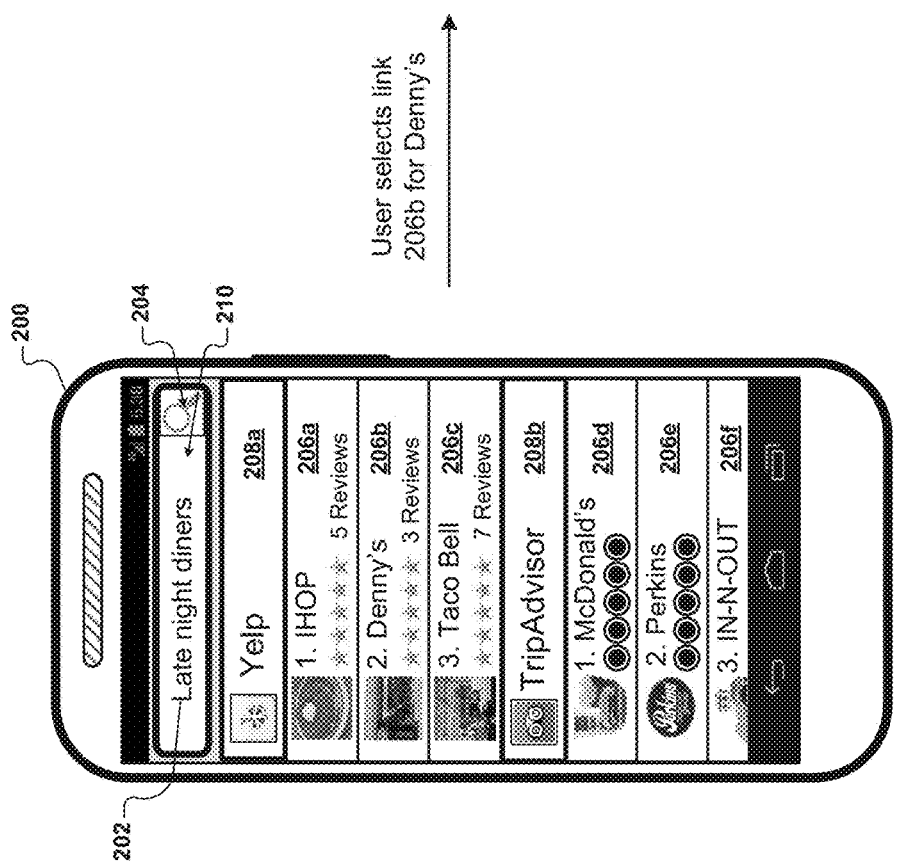

FIGS. 7A-7B illustrate an example of a search application on a user device 200. In FIG. 7A, a user has entered a search query 202 into a GUI of the search application. Specifically, the user has entered the search query "Late night diners" into a search field (e.g., a search bar) 210 of the GUI. The user can select (e.g., touch or click) a search button 204 of the GUI to transmit a query wrapper including the search query 202 to the search system 100.

The search system 100 receives the query wrapper and identifies one or more function records based on the search query 202 included in the query wrapper. The search system 100 processes the identified function records and selects AAMs from the identified function records. In the example of FIG. 7A, the search system 100 identified function records that represent application states in the native application Yelp and the native application "TRIPADVISOR®" by TripAdvisor, LLC (hereinafter, "TripAdvisor"). For example, the search system 100 identified function records that correspond to the entries in Yelp for "IHOP," "Denny's," and "Taco Bell." The search system 100 also identified function records that correspond to the entries in TripAdvisor for "McDonald's," "Perkins," and "In-N-Out." Although only links for Yelp and TripAdvisor are visible in the GUI in FIG. 7A, the search system 100 may have identified additional function records for Yelp, TripAdvisor, and additional native applications that are not illustrated in FIG. 7A. Furthermore, the search system 100 may have transmitted additional AAMs to the user device 200 that are not shown in the GUI of FIG. 7A.

The search results transmitted to the user device 200 include AAMs for the application functions/states indicated in the links 206a, 206b, . . . , 206f (collectively, the "links 206"). The search results also include link data (e.g., text and images) associated with each of the AAMs. For example, the "IHOP" link 206a includes the text "IHOP" and an image of pancakes. A user may select (e.g., touch or click) the links 206 to access the application function/state indicated in the links 206. For example, a user may select the area of the GUI including the "IHOP" link 206a in order to access the entry in the Yelp native application for "IHOP." In FIG. 7A, the links 206 are grouped together according to the native applications associated with the links 206. For example, the Yelp links 206a, 206b, and 206c and the TripAdvisor links 206d, 206e, and 206f are grouped together under Yelp and TripAdvisor headers 208a, 208b, respectively. In other examples, links for different native applications may be mixed instead of grouped.

In the example of FIG. 7A, the user selects the "Denny's" link 206b. In response to selection of the "Denny's" link 206b, the user device 200 launches the Yelp native application and performs one or more operations according to the AAM associated with the "Denny's" link 206b. In the example of FIG. 7A, the AAM associated with the "Denny's" link 206b may reference the Yelp native application and indicate a path for the Yelp native application to find information for the "DENNY'S®" restaurant listed in the link. For example, an ARI may reference the Yelp native application and indicate one or more operations for the Yelp native application to perform, such as retrieving data from the path included in the ARI. Accordingly, the ARI of the AAM may cause the Yelp native application to perform the function of retrieving and displaying information for the "DENNY'S®" restaurant. An example ARI for the Yelp native application may include the string "yelp:///biz/dennys-sunnyvale." FIG. 7B shows an example GUI 212 of the Yelp native application after the user has selected the "Denny's" link 206b. In FIG. 7B, the Yelp native application is set into a state in which the Yelp native application is displaying retrieved information about the "DENNY'S®" restaurant.

Figure 8B:
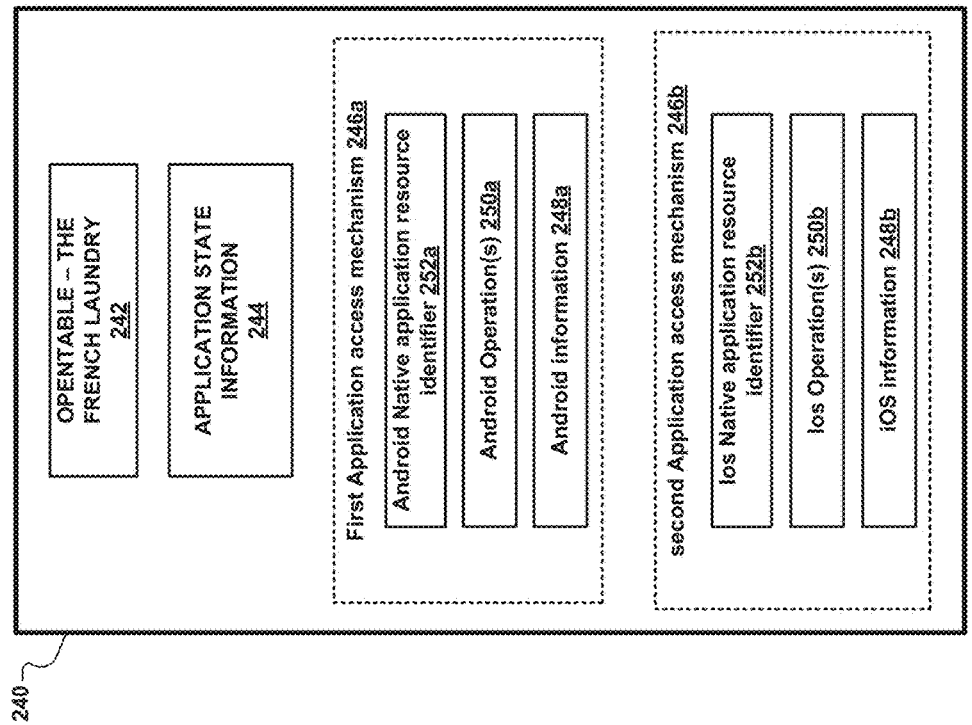
FIGS. 8A-8B are schematic views of example function records that include multiple native application access mechanisms.
Figure 8A:
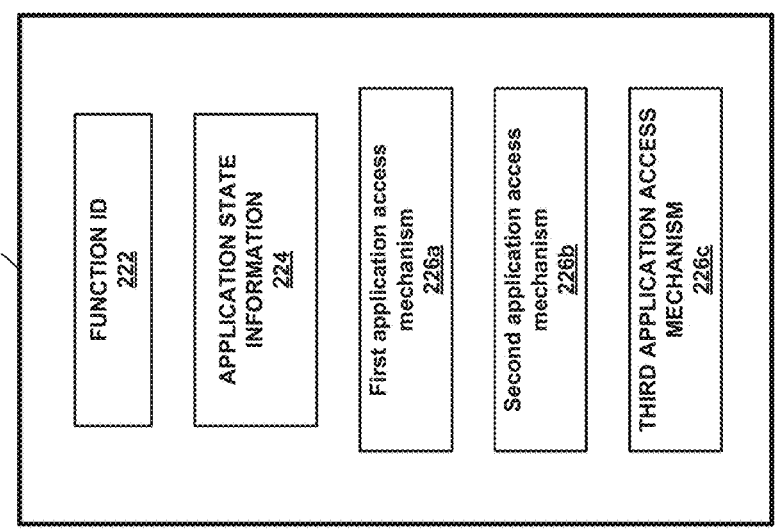

FIG. 8A shows an example function record 220 including multiple different AAMs. The function record 220 includes a function ID 222 and ASI 224, as described above. The function record 220 includes a first AAM 226a, a second AAM 226b, and a third AAM 226c (collectively, the "AAMs 226").

The different AAMs 226 included in the function record 220 may be associated with different editions of a native application. For example, the first, second, and third AAMs 226 may be associated with first, second, and third editions of a native application, respectively. The different AAMs 226 in the function record 220 may be associated with different operating systems and/or different versions of a native application. In a specific example, the AAMs 226 may be associated with different operating systems. For example, the AAMs 226 may each include an ARI that is specific to a different OS, such as ANDROID®, IOS®, or WINDOWS PHONE®. More specifically, an ARI for a first edition of a native application that runs on a first OS may be different than an ARI for a second edition of the native application that runs on a second OS. As another example, the ARIs of the AAMs 226 may be different for native application editions that are different versions, but run on the same OS. The operations included in the AAMs 226 may also be specific to different operating systems and/or versions.

In some examples, the different AAMs 226 in the function record 220 may be associated with different versions of a native application for the same OS. For example, the AAMs 226 may each be associated with a different version of a native application for the ANDROID® OS. Different versions may include a version 1.0 of a native application and a later released version 2.0 of the native application. In another example, different versions of a native application may be versions of the native application designed for different devices. For example, a first version of a native application may be designed for a smart phone. A second version of the native application may be designed for a tablet computing device having a different set of specifications (e.g., screen size and resolution) than the smart phone for which the first version of the native application was designed.

As described with respect to FIG. 3B, an AAM may include edition information that indicates the native application edition with which the AAM is associated. In this context, the first AAM 226a may include an ARI and/or one or more operations that are compatible with a specific native application edition. The first AAM 226a may also include edition information that indicates the specific native application edition with which the ARI and/or the operations are compatible. The second and third AAMs 226b, 226c may also include edition information that indicates the specific native application editions with which the second and third AAMs 226b, 226c are associated.

The different AAMs 226 included in the function record 220 may cause the corresponding native application editions to launch and perform similar functions so that the application editions are set into similar application states. For example, the different AAMs 226 included in the function record 220 may cause the corresponding native application editions to be set into the application state described by the function record 220 (e.g., the ASI 224). Accordingly, although the ARIs and/or the operations included in the AAMs 226 may be different, the different AAMs 226 may cause the different native application editions to be set into similar application states. In one example, if the different AAMs 226 reference different editions of an internet music player application, the different AAMs 226 may cause the different application editions to play the same song. In another example, if the different AAMs 226 reference different editions of a restaurant reservation application, the different AAMs 226 may cause the different editions to retrieve reservation information for the same restaurant.

FIG. 8B shows a specific example of a function record 240 for an entry for The French Laundry in the OpenTable native application. The function record 240 includes the function ID 242 "Opentable—The French Laundry." The function record 240 also includes ASI 244 that may include information that is similar to that described above with respect to FIG. 3C.

The function record 240 includes two AAMs 246a, 246b. The first AAM 246a is associated with an edition of OpenTable that runs on the ANDROID® OS. Accordingly, the edition (i.e., ANDROID®) information 248a may indicate that the ANDROID® operations 250a and the ANDROID® native ARI 252a are compatible with the ANDROID® OS. Furthermore, the edition information 248a may specify one or more specific versions of the ANDROID® OS and one or more versions of the OpenTable application with which the ARI 252a and the operations 250a are compatible. The second AAM 246b is associated with an edition of OpenTable that runs on the IOS® OS. Accordingly, the edition (i.e., IOS) information 248b may indicate that the IOS® operations 250b and the IOS® native ARI 252b are compatible with the IOS) OS. Furthermore, the edition information 248b may specify one or more specific versions of the IOS® OS and one or more versions of the OpenTable application with which the ARI 252b and the operations 250b are compatible.

During a search for function records, the search system 100 (e.g., the set generation module 124) may identify one or more function records that include multiple AAMs, as described above. In these scenarios, the set processing module 126 may process (e.g., score) the identified set of function records in the manner described above. For example, the set processing module 126 may select function records from the consideration set based on the result scores associated with function records.

As described above, the set processing module 126 selects AAMs from the selected function records (e.g., the highest scoring function records) and transmits the selected AAMs to the user device 102 that generated the search query 128. In some implementations of the search system 100, the set processing module 126 may transmit each of the multiple AAMs of a function record to the user device 102 so that the user device 102 can determine which AAM to use. For example, assuming the function record 240 of FIG. 8B was selected by the set processing module 126, the set processing module 126 may transmit both the first and second AAMs 246a, 246b to the user device 102. In this example, the user device 102 may determine which of the AAMs 246a, 246b to use. If the user device 102 is running an ANDROID® OS, the user device 102 could select the first AAM 246a. Alternatively, if the user device 102 is running an IOS® OS, the user device 102 could select the second AAM 246b.

In some implementations of the search system 100, the set processing module 126 determines which of multiple AAMs of a function record to transmit to the user device 102. The set processing module 126 may determine which of the AAMs to transmit using information included in the query wrapper received from the user device 102. For example, the set processing module 126 may select and transmit one or more of the AAMs that are likely to be compatible with the user device 102. In cases where the function record 240 of FIG. 8B is selected by the set processing module 126 and the set processing module 126 determines that the user device 102 is running the ANDROID® OS, the set processing module 126 may select the first AAM 246a to transmit to the user device 102, and refrain from transmitting the second AAM 246b associated with the IOS® OS to the user device 102.

FIG. 9 shows an example function record 260 that includes a WAM 262. The function record 260 also includes a function ID 264, ASI 266, and one or more AAMs 268, as described above. The WAM 262 may be used by a wide variety of user devices 102 running different operating systems. In some examples, the WAM 262 includes a web resource identifier, such as a URL (i.e., a web address) used with HTTP.

The WAM 262 (e.g., a URL) included in the function record 260 may be used by a web browser application to access a web resource that includes similar information and/or performs similar functions as would be performed by a native application that receives the AAM(s) 268 of the function record 260. In one example, the WAM 262 may direct a web browser to a web version of the native application referenced in the AAM(s) 268. If the function record 260 is for a specific Mexican restaurant in Yelp, the AAM(s) 268 may include a reference to Yelp and one or more operations that access an entry for the specific Mexican restaurant in Yelp. In this example, the WAM 262 may include a web address that a web browser may use to access the entry for the specific Mexican restaurant on a Yelp web page.

During a search for function records, the search system 100 (e.g., the set generation module 124) may identify one or more function records that each include a WAM. In these scenarios, the set processing module 126 may process (e.g., score) the identified set of function records in the manner described above. For example, the set processing module 126 may select function records from the consideration set based on the result scores associated with the identified function records.

In some implementations of the search system 100, the set processing module 126 determines which of the multiple AAM(s) 268 and the WAM 262 should be transmitted to the user device 102. The set processing module 126 may determine whether to transmit the WAM 262 and/or the AAM(s) 268 of the function record 260 based on information included in the query wrapper received from the user device 102. For example, the set processing module 126 may select and transmit the WAM 262 and/or the AAM(s) 268 based on which of the WAM 262 and/or the AAM(s) 268 are likely to be compatible with the user device 102.

In scenarios where the set processing module 126 determines that one or more of the AAM(s) 268 is compatible with the user device 102, the set processing module 126 may transmit the one or more compatible AAMs. In these scenarios, the set processing module 126 may refrain from transmitting the WAM 262 and those AAMs that are determined to be incompatible with the user device 102. In other scenarios, if the set processing module 126 determines that none of the AAM(s) 268 is compatible with the user device 102, the set processing module 126 may transmit the WAM 262 and refrain from transmitting the AAM(s) 268.

FIG. 10 shows an example function record 280 that includes one or more application download addresses 282. The function record 280 also includes a function ID 284, ASI 286, one or more AAMs 288, and a WAM 290, as described above. An application download address 282 can be used by a user device 102 to download the native application referenced in the AAM(s) 288 in the event that the native application is not installed on the user device 102. In some examples, the application download address 282 may include a web address (e.g., a URL) at which the native application can be previewed and downloaded. For example, the application download address 282 may direct a web browser of a user device 102 to a digital distribution platform that is configured to distribute native applications. Example digital distribution platforms include, but are not limited to, GOOGLE PLAY® developed by Google Inc., the APP STORE® developed by Apple Inc., and WINDOWS PHONE STORE developed by Microsoft Corporation. If a user device 102 includes a native download application for accessing a digital distribution platform, the application download address 282 may direct the installed native download application to a site where the native application referenced in the AAM(s) 288 can be downloaded. In other examples, the application download address 282 may indicate a location from which another location where the native application can be downloaded can be accessed.

During a search, the search system 100 (e.g., the set generation module 124) may identify one or more function records that each include an application download address 282. In these cases, the set processing module 126 may process (e.g., score) the identified set of function records as described above. The set processing module 126 may also select function records from the consideration set and select which AAMs of the selected function records to transmit to the user device 102, as described above. The set processing module 126 may transmit the selected AAMs and the one or more application download addresses 282 to the user device 102.

As described above, different AAMs in a function record may be associated with different operating systems. A first AAM may be for a native application running on the ANDROID® OS. A second AAM may be for the native application running on the IOS® OS. In this example, the first AAM can be associated with a first application download address for downloading the ANDROID® edition of the native application. The second AAM can be associated with a second application download address for downloading the IOS® edition of the native application.

Figure 12:
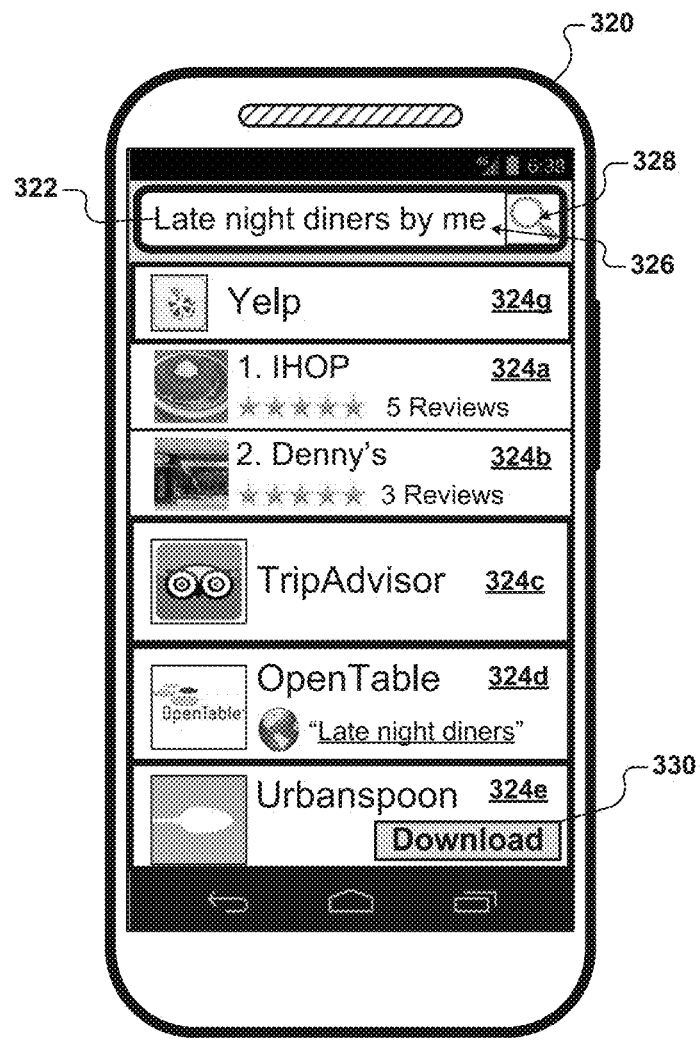
FIG. 12 is a schematic view of an example GUI that includes various different user selectable links.

As described above, the search system 100 may transmit an AAM 288 and an application download address 282 for downloading the native application referenced in the AAM 288. If the user device 102 has the native application that is referenced in the AAM 288 installed, then the user device 102 (e.g., the search application 116) can generate a user selectable link that uses the AAM 288. For example, in response to selection of the user selectable link using the AAM 288, the user device 102 launches the native application referenced in the AAM 288 and performs one or more operations included in the AAM 288. If the user device 102 does not have the native application installed, the user device 102 can determine that the native application is not installed and then generate a user selectable link that uses the application download address 282. In response to selection of the user selectable link using the application download address 282, the user device 102 can launch the web browser or a native application and direct the user to a site (e.g., a digital distribution platform) where the native application can be downloaded. A user selectable link including the application download address 282 may include link data (e.g., text and/or images) indicating that the user can download the native application by selecting (e.g., touching) the link. An example user selectable link 324e including an application download address is shown in FIG. 12.

As described above, the data store 108 may include one or more databases, indices (e.g., inverted indices), tables, files, or other data structures which may be used to implement the techniques of the present disclosure. In some examples, as described above with reference to FIGS. 4D-4E, the data store 108 may include access tables that include different access mechanisms. With respect to FIG. 10, an access table for the function record 280 may include the application download addresses 282, the WAM 290, and the AAM(s) 288. The access table may also include the function ID 284, which serves as a unique identifier for the access table. In examples where the data store 108 includes access tables for function records, the search system 100 may identify function records and score the function records as described above. The search system 100 may then select the access mechanisms from the access tables identified by the function IDs of the function records and transmit the access mechanisms in the access tables to the user device 102. For example, with respect to the function record 280 of FIG. 10, the search system 100 may identify and score the function record 280 as described above. The search system 100 (e.g., the set processing module 126) may then use the function ID 284 to identify an access table that includes the application download addresses 282, the WAM 290, and the AAM(s) 288. The search system 100 can then transmit the application download addresses 282, the WAM 290, and the AAM(s) 288.

Multiple different ways for accessing native application functionality and/or web application functionality are described above. For example, a user device 102 may access functionality of a native application using an AAM. In the case where the user device 102 does not have a native application installed, the user device 102 may download the native application by following the application download address, thereby allowing the user device 102 to use the AAM in the search results. Additionally, or alternatively, the user device 102 may also access functionality of a web application using a WAM. For example, if the user device 102 does not have a native application installed, the user device 102 may instead generate a user selectable link including a WAM to access similar functionality. Providing these different mechanisms for accessing functionality may help ensure that a user device 102 has the ability to access the desired functionality present in the search results.

In some examples, the search application 116 may be configured to generate user selectable links according to a hierarchy. For example, the search application 116 may be configured to generate a link including an AAM if a compatible AAM is received and the native application is currently installed. If the native application is not installed, then the search application 116 may generate a link including the WAM or including the application download address. In some examples, instructions to the search application 116 for which mechanism to use may be included along with the search results.

Referring now to FIG. 11, the function record 300 includes a quality score 302. The function record 300 also includes a function ID 304, ASI 306, and one or more AAMs 308, as described above. The quality score 302 may be included in any of the function records described herein. The quality score 302 may be a number used by the search system 100 to generate a result score for the function record 300. For example, the set processing module 126 may generate the result score for the function record 300 based on the quality score 302 included in the function record 300. As described above, in some implementations, the set processing module 126 generates a result score for a function record based on one or more scoring features, including record scoring features that may be based on data associated with a function record. For those function records that include quality scores, the set processing module 126 may use the quality score as a record scoring feature. In these examples, the set processing module 126 may generate a result score based on the quality score 302. For example, one or more machine learned models may generate result scores using the quality score 302 as a record scoring feature.

The quality score 302 may be determined based on metrics associated with the person, place, or thing described in the function record 300 (e.g., in the ASI 306). For example, the quality score 302 may be based on the popularity of a place described in the function record 300 and/or ratings (e.g., user ratings) of the place described in the function record 300. In another example, the quality score 302 may be based on the popularity of a song described in the function record 300 and/or ratings (e.g., user ratings) of the song described in the function record 300. The quality score 302 may also be determined based on measurements associated with the function record 300. For example, the quality score 302 may be determined based on data indicating how often the function record 300 is retrieved during a search and how often the AAM(s) 308 of the function record 300 are selected by a user.

FIG. 12 illustrates an example GUI of a search application 116 running on a user device 320. In FIG. 12, a user has entered a search query 322 ("Late night diners by me") into the GUI of the search application 116 (e.g., into a search field 326 of the GUI). The user has interacted with the GUI in order to transmit a query wrapper including the search query 322 to the search system 100 (e.g., by selecting a search button 328 of the GUI). The search system 100 has identified function records and selected AAMs, WAMs, and application download addresses from the identified function records, as described above. In the example of FIG. 12, the search system 100 has identified function records including references to the native applications Yelp, TripAdvisor. OpenTable, and "URBANSPOON®" by Wanderspot LLC (hereinafter, "Urbanspoon"). It may be assumed that the user device 320 of FIG. 12 has the Yelp and TripAdvisor native applications installed. It may also be assumed that the OpenTable and Urbanspoon native applications are not installed on the user device 320.

The GUI of FIG. 12 illustrates different types of links 324a, 324b . . . , 324e for the function records identified for Yelp, TripAdvisor, OpenTable, and Urbanspoon. As described above, the search system 100 has identified function records that correspond to the entries in Yelp for "IHOP" and "Denny's," which are included in the GUI. The links 324a, 324b include AAMs that launch the Yelp native application and retrieve the entries in Yelp for "IHOP" and "Denny's." If the Yelp native application was not installed on the user device 320, the GUI may still display the entries in Yelp for "IHOP" and "Denny's," but the user device 320 may include an application download address in the links 324a, 324b so that, upon a user selecting any of the links 324a, 324b, the user device 320 would be directed to download the Yelp native application. In an example where the links 324a. 324b include an application download address, the links 324a, 324b may also include data (e.g., text and/or images) that indicate to a user that selection of the links 324a, 324b will direct the user to a site for downloading the Yelp native application. For example, the links 324a, 324b may include text and/or an image that says "Download." The GUI of FIG. 12 also includes a link 324g that represents a Yelp header for the links 324a, 324b, as described herein.

The link 324c may be associated with an AAM for the TripAdvisor native application. For example, the AAM included in the link 324c may cause the user device 320 to launch the TripAdvisor native application to a default state, as described above.

The link 324d may be a WAM for the OpenTable web application. For example, the WAM may direct a web browser of the user device 320 to entries for one or more late night diners in OpenTable. Accordingly, in response to selection of the link 324d, the user device 320 may launch a web browser and retrieve information at the web address included in the WAM. As described above, since the OpenTable native application is not installed on the user device 320, the search application may have presented the link 324d to the user so that the user could access the desired functionality via a WAM.

The link 324e may include an application download address for the Urbanspoon native application. Since the user device 320 does not have the Urbanspoon native application installed, the user device 320 displays the link 324e that includes an application download address for the Urbanspoon native application. The user device 320 also displays the link 324e such that it includes a GUI element 330 with a string "Download," which prompts the user to select the link 324e to download and install Urbanspoon. In response to selection of the link 324e, the user device 320 may access a site (e.g., a digital distribution platform) for downloading the Urbanspoon native application.

In some implementations, a function record may include location data. The search system 100 may use the location data in the function records to filter out function records that may not be relevant to a user because of the location of the user relative to the places described in the function records. For example, the search system 100 may filter out function records in which the user is located too far from the place described in the function record for the place to be relevant to the user.

Figure 13:
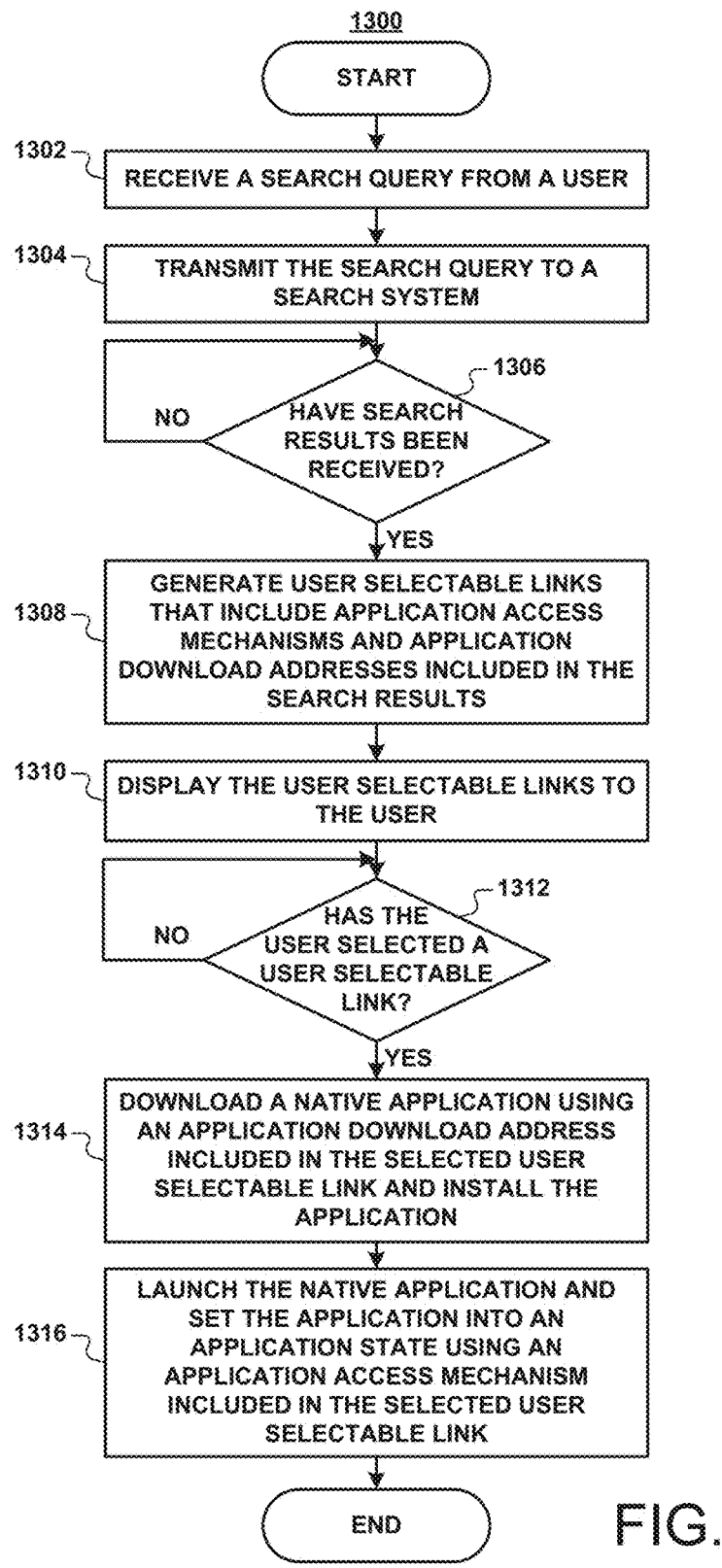
FIG. 13 is a flow diagram of another example method describing operation of a user device.
Figure 14:
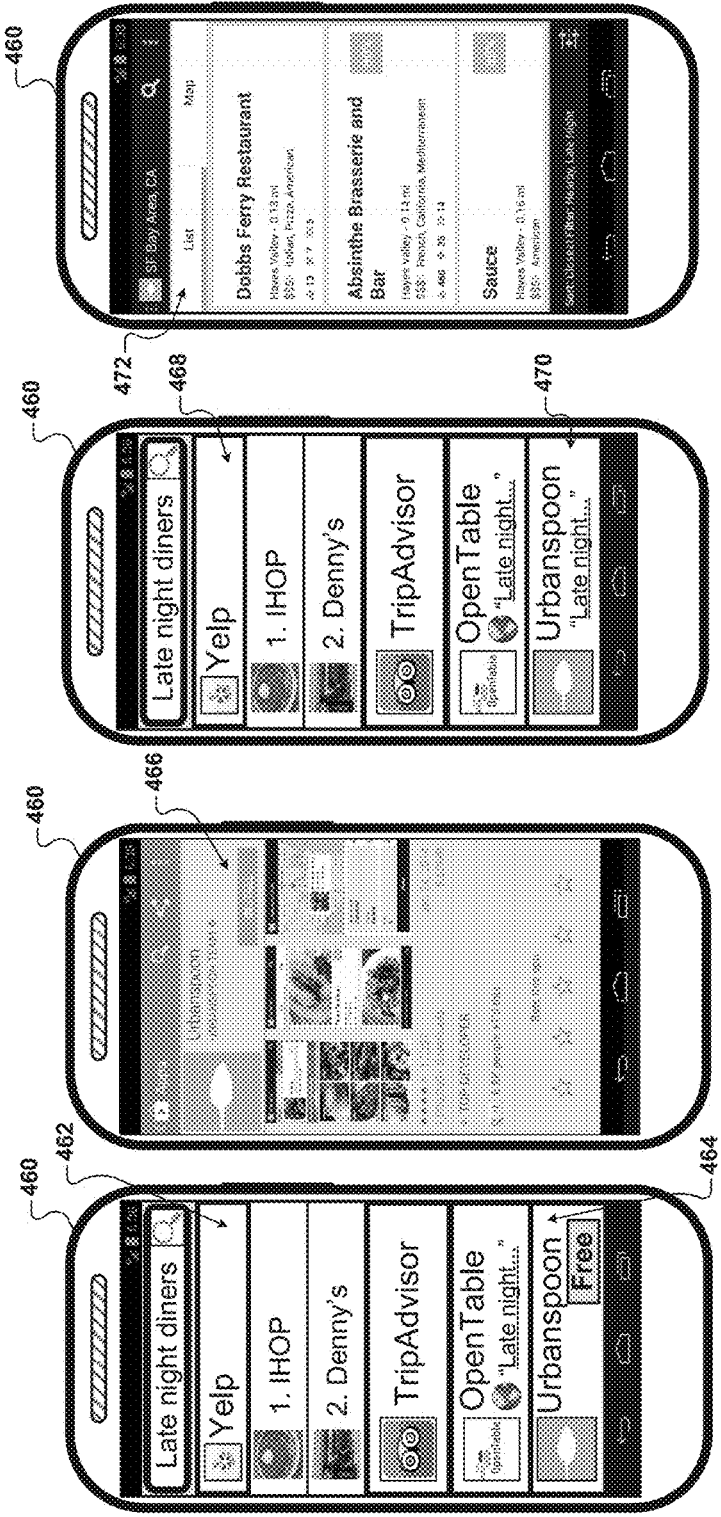
FIGS. 14A-14D are schematic views of other example GUIs that may be generated on a user device according to the present disclosure.

FIGS. 13-14D and the corresponding description below are directed to techniques for installing a native application on a user device 102. Specifically, FIG. 13 is a flow diagram that illustrates an example method for installing a native application on a user device 102 and setting the installed native application into a particular application state, consistent with the techniques of the present disclosure. FIGS. 14A-14D, in turn, illustrate example GUIs that may be displayed on a user device 102 both prior to and after a native application is installed on the user device 102 in the manner described with reference to FIG. 13.

FIG. 13 shows another example method 1300 describing operation of one of the user devices 102. In a similar manner as described above with reference to FIG. 6, it may be assumed that the user device 102 described according to the method 1300 includes a search application 116 that is configured to communicate with the search system 100, and that the search application 116 running on the user device 102 generates a GUI that receives search queries 128 from users of the user device 102, and displays search results 130 received by the user device 102 from the search system 100 in response to the user device 100 transmitting the search queries 128 to the search system 100. The method 1300 is described with reference to the search system 100 and one of the user devices 102 of FIGS. 1-2, and the components thereof.

In block 1302, the search application 116 receives a search query 128 from a user of the user device 102. For example, the user may have entered the search query 128 into the GUI (e.g., into a search field of the GUI) of the search application 116. In block 1304, the user device 102 transmits the search query 128 to the search system 100. For example, the user may have caused the user device 102 to transmit the search query 128 to the search system 100 by selecting (e.g., touching, or clicking on) a search button included in the GUI. In block 1306, the user device 102 waits to receive search results 130 that are responsive to the search query 128 from the search system 100. The method 1300 continues in block 1308 when the user device 102 receives the search results 130 from the search system 100 in response to transmitting the search query 128 to the search system 100. As described herein, the search results 130 received by the user device 102 from the search system 100 may include one or more AAMs that each reference a native application and indicate one or more operations for the application to perform. As also described herein, the search results 130 may further include one or more application download addresses that each indicate a location (e.g., a digital distribution platform) at which the user device 102 may download a native application referenced by one of the AAMs included in the search results 130. For example, for each of one or more of the AAMs included in the search results 130, the search results 130 may further include one or more application download addresses that are each associated with the AAM (i.e., that each indicate a location at which the user device 102 may download the native application referenced by the AAM). In some examples, the search results 130 may further include one or more WAMs. The search results 130 may also include one or more result scores associated with the AAMs, as also described herein. Additionally, the search results 130 may include link data (e.g., text and/or images) for each of the AAMs, as further described herein. As described in greater detail below, the search application 116 may generate one or more user selectable links for the AAMs included in the search results 130 using the received link data, and display the links to the user within the GUI (e.g., by arranging the links within a list using the corresponding received results scores). As also described in greater detail below, the search application 116 may generate the user selectable links such that one or more of the links each includes one or more of the application download addresses included in the search results 130.

Accordingly, in block 1308, the search application 116 generates one or more user selectable links that include the AAMs and the application download addresses included in the search results 130 (e.g., using link data received from the search system 100 as part of the search results 130). For example, the search application 116 may generate one user selectable link for each AAM included in the search results 130. The search application 116 may further generate the user selectable links such that each of one or more of the links also includes one or more of the application download addresses included in the search results 130. For example, the search application 116 may generate the user selectable links such that each of one or more of the links includes one of the AAMs included in the search results 130 and one or more of the application download addresses included in the search results 130 that are each associated with the AAM (i.e., that each indicate a location at which the user device 102 may download the native application referenced by the AAM). In some examples, the search application 116 may generate a particular user selectable link such that the link includes one or more of the application download addresses in the event the native application referenced by the AAM included in the link is not currently installed on the user device 102. In block, 1310, the search application 116 displays the user selectable links to the user. For example, the search application 116 may arrange the user selectable links within a list (e.g., using result scores received from the search system 100 as part of the search results 130), and display the list within the GUI of the search application 116. In block 1312, the search application 116 waits for the user to select one of the user selectable links displayed to the user via the GUI. The method 1300 continues in block 1314 when the user selects (e.g., touches, or clicks on) one of the user selectable links.

In block 1314, in response to the user selecting one of the user selectable links, the user device 102 downloads the native application referenced by the AAM included in the selected user selectable link onto the user device 102, and installs the downloaded application on the user device 102. For example, to download the native application, the user device 102 may access a location (e.g., a digital distribution platform) indicated by an application download address also included in the selected user selectable link. For instance, the user device 102 may download and install the native application in parallel with (e.g., in the background of) the search application 116 included on the user device 102. In some examples, rather than automatically downloading and installing the native application in response to the user selecting one of the user selectable links, the user device 102 may be directed to the location indicated by the application download address (e.g., an entry, or a page, within a digital distribution platform for the native application). The user device 102 may then prompt (e.g., via a "Download," or "Install" GUI element, or button) the user to download the native application from the location onto the user device 102, and install the downloaded application on the user device 102 (e.g., as shown in FIG. 14B). The user may accept the prompt to cause the user device 102 to download the native application onto the user device 102, and install the downloaded application on the user device 102, in a similar manner as described above with reference to block 1314.

In block 1316, upon downloading and installing the native application, the user device 102 launches the application on the user device 102, and sets the launched application into an application state specified by the AAM using the AAM. For example, to set the native application into the application state, the user device 102 may cause the application to perform the one or more operations indicated by the AAM. In some examples, rather than automatically launching the native application and setting the launched application into the application state upon downloading and installing the application, the user device 102 may prompt (e.g., via an "Open," or a "View" GUI element, or button) the user to launch the application on the user device 102, and set the launched application into the application state (not shown). The user may accept the prompt to cause the user device 102 to launch the native application, and set the launched application into the application state, in a similar manner as described above with reference to block 1316. Additionally, or alternatively, the user device 102 may update the selected user selectable link, or generate a new user selectable link (e.g., as shown in FIG. 14C). The user may then select the updated or new user selectable link to cause the user device 102 to launch the native application on the user device 102, and set the launched application into the application state, in a similar manner as described above with reference to block 1316. In any case, upon launching the native application, and setting the launched application into the application state, the user device 102 may resize, suspend (e.g., pause), minimize, move to the background, terminate (e.g., close), or otherwise manipulate the search application 116 such that the user is able to interact with (e.g., perform one or more functions using) the newly launched native application and the application state thereof on the user device 102.

FIGS. 14A-14D illustrate other example GUIs that may be generated on one of the user devices 102 according to the present disclosure. Specifically, FIG. 14A shows an example GUI 462 of a search application 116 included on a user device 460. The GUI 462 includes some of the same or similar elements (e.g., user selectable links, headers, and other GUI elements, such as search fields, search buttons, and other buttons or links) as those of the GUI of the search application 116 included on the user device 320, as described above with reference to FIG. 12. As shown in FIG. 14A, the GUI 462 includes a user selectable link 464 that specifies an application state of Urbanspoon (e.g., a particular application state, or a main page, or screen of Urbanspoon). For example, as described herein, the link 464 may include an AAM that references Urbanspoon, and indicates one or more operations for Urbanspoon to perform. As also described herein, Urbanspoon performing the operations may set Urbanspoon into the application state. FIGS. 14B-

14D, in turn, show other GUIs displayed on the user device 460 as a result of a user of the user device 460 interacting with the GUI 462.

In the example of FIGS. 14A-14D, Urbanspoon is not installed on the user device 460. Accordingly, the link 464 may also include an application download address that indicates a location (e.g., a digital distribution platform, such as Google Play® by Google Inc.) where the user device 460 may download Urbanspoon. In response to the user selecting the link 464, the user device 460 may access the location, download Urbanspoon onto the user device 460, and install Urbanspoon on the user device 460. As shown in FIG. 14A, the link 464 also includes a GUI element, or button including the string "Free," which indicates that the user may select the link 464 (e.g., the button) to download and install Urbanspoon in the manner described above free of charge. In other examples, the link 464 may include a GUI element, or button including the string "Download," may which indicate that the user may select the link 464 (e.g., the button) to download and/or install Urbanspoon (e.g., for a fee).

In the example of FIGS. 14A-14D, the user selects the link 464 included in the GUI 462 of FIG. 14A. As a result of the user selecting the link 464, the user device 460 is directed to a location where the user device 460 may download Urbanspoon (e.g., a download site, or a digital distribution platform) specified by an application download address included in the link 464, as shown in FIG. 14B. Specifically, FIG. 14B shows an example GUI 466 displayed on the user device 460 when the user device 460 accesses the location (in this example, a GUI, or screen within Google Play® by Google Inc. for downloading Urbanspoon. The example GUI 466 of FIG. 14B includes a GUI element, or button, including the text "INSTALL," which the user may select to download and install Urbanspoon on the user device 460. In general, upon downloading Urbanspoon from the location, the user device 460 may install Urbanspoon on the user device 460. As described herein, in some examples, the user device 460 may automatically download and install Urbanspoon (e.g., in the background of the search application 116, without displaying a GUI associated with the location where Urbanspoon may be downloaded, and/or without prompting the user to download and/or install Urbanspoon).

After downloading and installing Urbanspoon in the manner described above, the user device 460 may display either an example GUI 468 shown in FIG. 14C, or an example GUI 472 shown in FIG. 14D. For example, with reference to FIG. 14C, upon the user device 460 downloading and installing Urbanspoon, the search application 116 may display the GUI 468. The GUI 468 is similar to the GUI 462 of FIG. 14A, with the exception that the link 464 of the GUI 468 has been modified, or replaced, to become a user selectable link 470. For example, the absence of the GUI element, or button including the string "Free," in the link 470 may indicate that Urbanspoon has been downloaded and installed on the user device 460. In the example of FIG. 14C, upon the user selecting the modified or replaced link 470, the user device 460 launches the newly installed Urbanspoon, and sets Urbanspoon into an application state specified by an AAM included in the links 470. For example, upon the user selecting the link 470, the user device 460 may launch Urbanspoon, and cause Urbanspoon to perform one or more operations indicated by the AAM. In this example, the AAM included in the link 470 may be the same as the AAM included along with the application download address in the link 464. In this manner, upon the user selecting the link 470, the user device 460 may launch Urbanspoon, and set Urbanspoon into the application state specified by the AAM included in the link 464, as shown in FIG. 14D. Additionally, in some examples, the link 470 may not include the application download address included in the link 464.

With reference to FIG. 14D, the GUI 472 shows an example GUI, or screen, of Urbanspoon that may be displayed on the user device 460 upon the user device 460 launching Urbanspoon, and setting Urbanspoon into the application state specified by the AAM included in the link 464. As described above, the user device 460 may launch Urbanspoon, and set Urbanspoon into the application state depicted in FIG. 14D in response to (e.g., automatically upon) the user device 460 downloading and installing Urbanspoon. As also described above, alternatively, the user device 460 may launch Urbanspoon, and set Urbanspoon into the application state shown in FIG. 14D in response to the user selecting the link 470 included in the GUI 468 of FIG. 14C.

Figure 15:
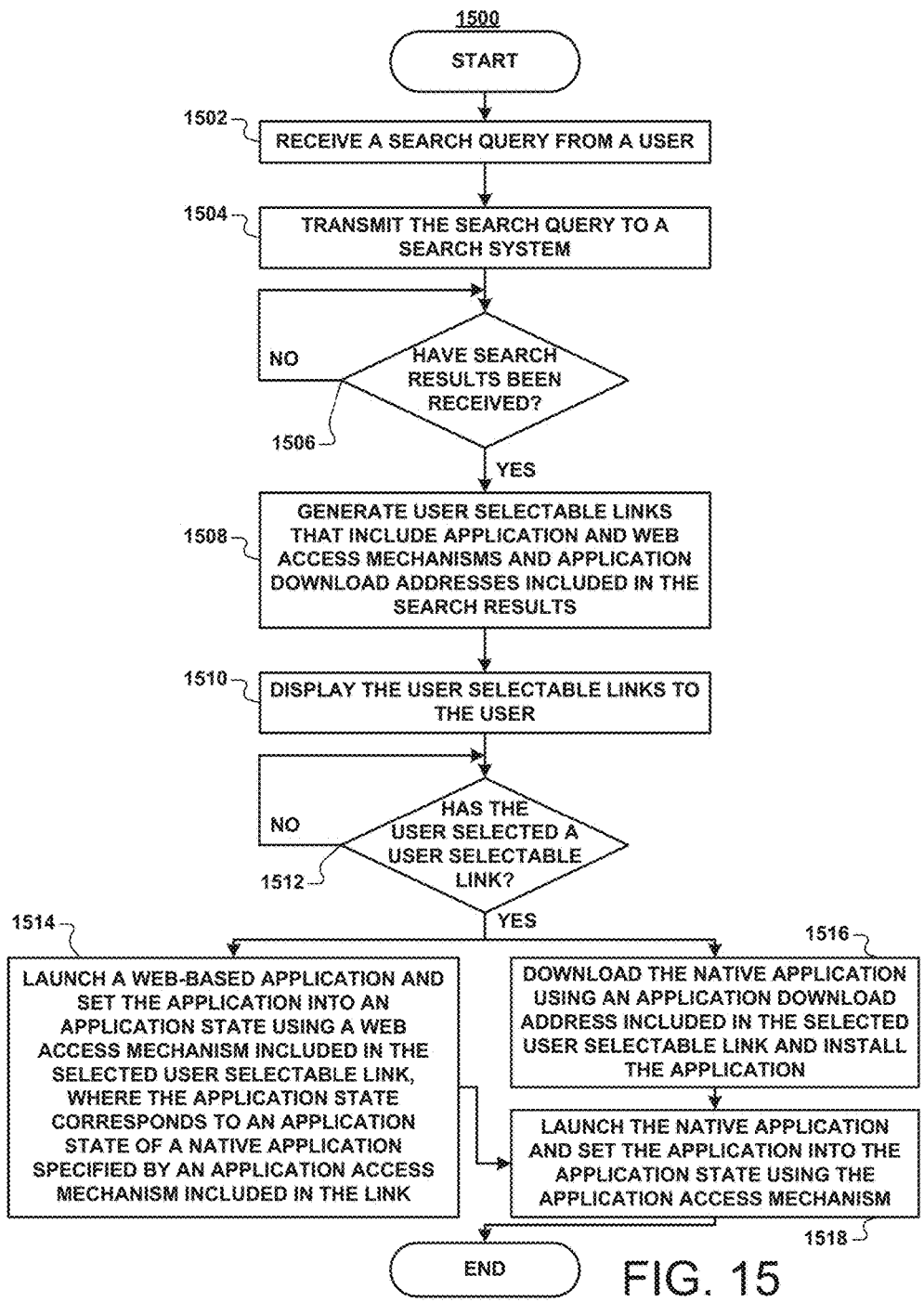
FIG. 15 is a flow diagram of another example method describing operation of a user device.

FIGS. 15-16D and the corresponding description below are directed to techniques for launching a web-based application on a user device 102. Specifically, FIG. 15 is a flow diagram that illustrates an example method for launching a web-based application on a user device 102, and setting the launched web-based application into a particular application state, consistent with the techniques of the present disclosure. FIGS. 16A-16D, in turn, illustrate example GUIs that may be displayed on a user device 102 both prior to and after a web-based application is launched on the user device 102 in the manner described with reference to FIG. 15.

FIG. 15 shows another example method 1500 describing operation of one of the user devices 102. In a similar manner as described above with reference to FIGS. 6 and 13, it may be assumed that the user device 102 described according to the method 1500 includes a search application 116 that is configured to communicate with the search system 100, and that the search application 116 running on the user device 102 generates a GUI that receives search queries 128 from users of the user device 102, and displays search results 130 received by the user device 102 from the search system 100 in response to the user device 100 transmitting the search queries 128 to the search system 100. The method 1500 is described with reference to the search system 100 and one of the user devices 102 of FIGS. 1-2, and the components thereof.

In block 1502, the search application 116 receives a search query 128 from a user of the user device 102. For example, the user may have entered the search query 128 into the GUI (e.g., into a search field of the GUI) of the search application 116. In block 1504, the user device 102 transmits the search query 128 to the search system 100. For example, the user may have caused the user device 102 to transmit the search query 128 to the search system 100 by selecting (e.g., touching, or clicking on) a search button included in the GUI. In block 1506, the user device 102 waits to receive search results 130 that are responsive to the search query 128 from the search system 100. The method 1500 continues in block 1508 when the user device 102 receives the search results 130 from the search system 100 in response to transmitting the search query 128 to the search system 100. As described herein, the search results 130 received by the user device 102 from the search system 100 may include one or more AAMs that each reference a native application and indicate one or more operations for the application to perform. As also described herein, the search results 130 may further include one or more WAMs that each specify an application state of a web-based application (e.g., reference the web-based application and indicate one or more operations for the application to perform). For example, each of the one or more WAMs included in the search results 130 may specify an application state of a web-based application that corresponds, or is similar to an application state of a native application specified by one of the one or more AAMs included in the search results 130. For instance, for each of one or more of the AAMs included in the search results 130, the search results 130 may further include one or more WAMs that are each associated with the AAM (i.e., that each specify an application state of a web-based application that corresponds, or is similar to an application state of a native application specified by the AAM). As described herein, each of the one or more WAMs included in the search results 130 may include a resource identifier (e.g., a URL, or a web address) that identifies a web resource (e.g., a web page of a website). In this manner, each WAM may specify a web page of a website that includes the same or similar information as that of a GUI, or screen, of a native application specified by one of the AAMs.

As also described herein, the search results 130 may still further include one or more application download addresses that each indicate a location (e.g., a digital distribution platform) at which the user device 102 may download a native application referenced by one of the AAMs included in the search results 130. For example, for each of one or more of the AAMs included in the search results 130, the search results 130 may further include one or more application download addresses that are each associated with the AAM (i.e., that each indicate a location at which the user device 102 may download the native application referenced by the AAM). The search results 130 may also include one or more result scores associated with the AAMs, as also described herein. Additionally, the search results 130 may include link data (e.g., text and/or images) for each of the AAMs, as further described herein. As described in greater detail below, the search application 116 may generate one or more user selectable links for the AAMs included in the search results 130 using the received link data, and display the links to the user within the GUI (e.g., by arranging the links within a list using the corresponding received results scores). As also described in greater detail below, the search application 116 may generate the user selectable links such that one or more of the links each includes one or more of the WAMs included in the search results 130. As further described in greater detail below, the search application 116 may generate the user selectable links such that one or more of the links each includes one or more of the application download addresses included in the search results 130.

Accordingly, in block 1508, the search application 116 generates one or more user selectable links that include the AAMs, the WAMs, and the application download addresses included in the search results 130 (e.g., using link data received from the search system 100 as part of the search results 130). For example, the search application 116 may generate one user selectable link for each AAM included in the search results 130. The search application 116 may further generate the user selectable links such that each of one or more of the links also includes one or more of the WAMs included in the search results 130. For example, the search application 116 may generate the user selectable links such that each of one or more of the links includes one of the AAMs included in the search results 130 and one or more of the WAMs included in the search results 130 that are each associated with the AAM (i.e., that each specify an application state of a web-based application that corresponds, or is similar to an application state of a native application specified by the AAM). In some examples, the search application 116 may generate a particular user selectable link such that the link includes one or more of the WAMs in the event the native application referenced by the AAM included in the link is not currently installed on the user device 102. The search application 116 may still further generate the user selectable links such that each of one or more of the links also includes one or more of the application download addresses included in the search results 130. For example, the search application 116 may generate the user selectable links such that each of one or more of the links includes one of the AAMs included in the search results 130 and one or more of the application download addresses included in the search results 130 that are each associated with the AAM (i.e., that each indicate a location at which the user device 102 may download the native application referenced by the AAM). In some examples, the search application 116 may generate a particular user selectable link such that the link includes one or more of the application download addresses in the event the native application referenced by the AAM included in the link is not currently installed on the user device 102.

In block, 1510, the search application 116 displays the user selectable links to the user. For example, the search application 116 may arrange the user selectable links within a list (e.g., using result scores received from the search system 100 as part of the search results 130), and display the list within the GUI of the search application 116. In block 1512, the search application 116 waits for the user to select one of the user selectable links displayed to the user via the GUI. The method 1500 continues in blocks 1514 and 1516 when the user selects (e.g., touches, or clicks on) one of the user selectable links.

In block 1514, in response to the user selecting one of the user selectable links, the user device 102 launches a web-based application referenced by a WAM included in the selected user selectable link on the user device 102, and sets the launched application into an application state specified by the WAM using the WAM. In this example, the application state corresponds, or is similar to an application state of a native application specified by the AAM included in the selected user selectable link. For example, to set the web-based application into the application state, the user device 102 may cause the web-based application to perform the one or more operations indicated by the WAM. For instance, the user device 102 may launch a web browser application 120 included on the user device 102, and cause the launched web browser application 120 to access a web resource (e.g., a web page of a website) identified by the WAM (e.g., by a resource identifier, such as a URL, or a web address, included in the WAM). In some examples (not shown), rather than automatically launching the web-based application and setting the launched application into the application state specified by the WAM in response to the user selecting the one of the user selectable links, the user device 102 may prompt (e.g., via a "View Web Version," or another GUI element, or button) the user to launch the web-based application and set the launched application into the application state. The user may accept the prompt to cause the user device 102 to launch the web-based application and set the launched application into the application state, in a similar manner as described above with reference to block 1514. In any case, upon the user device 102 launching the web-based application and setting the launched application into the application state, the user may interact with the application state of the web-based application. For example, the user may cause the web-based application to perform some or all of the functions associated with the corresponding, or similar application state of the native application specified by the AAM included in the selected user selectable link.

In block 1516, also in response to the user selecting the one of the user selectable links, the user device 102 downloads the native application referenced by the AAM included in the selected user selectable link onto the user device 102, and installs the downloaded application on the user device 102, in a similar manner as described above with reference to FIG. 13. For example, to download the native application, the user device 102 may access a location (e.g., a digital distribution platform) indicated by an application download address also included in the selected user selectable link. For instance, the user device 102 may download and install the native application in parallel with (e.g., in the background of) the user device 102 launching the web-based application and setting the launched application into the application state specified by the WAM, as described above. In some examples, rather than automatically downloading and installing the native application in response to the user selecting the one of the user selectable links, the user device 102 may be directed to the location indicated by the application download address (e.g., an entry, or a page, within a digital distribution platform for the native application). The user device 102 may then prompt (e.g., via a "Download," or "Install" GUI element, or button) the user to download the native application from the location onto the user device 102, and install the downloaded application on the user device 102 (e.g., as shown in FIG. 14B). The user may accept the prompt to cause the user device 102 to download the native application onto the user device 102, and install the downloaded application on the user device 102, in a similar manner as described above with reference to block 1516.

The method 1500 continues from each of blocks 1514 and 1516 to block 1518. In some examples, the method 1500 may automatically continue from blocks 1514 and 1516 to block 1518 upon the user device 102 downloading and installing the native application, as described above with reference to block 1516. In these examples, upon downloading and installing the native application, the user device 102 may launch the application on the user device 102, and set the launched application into the application state specified by the AAM using the AAM, as described below with reference to block 1518. In other examples, the method 1500 may continue from blocks 1514 and 1516 to block 1518 in response to a user input. In these examples, upon downloading and installing the native application, the user device 102 may prompt (e.g., via a "View Native Version," or another GUI element, or button) the user to launch the native application on the user device 102, and set the launched application into the application state specified by the AAM (not shown). The user may accept the prompt to cause the user device 102 to launch the native application, and set the launched application into the application state, in a similar manner as described below with reference to block 1518. Additionally, or alternatively, upon downloading and installing the native application, the user device 102 may update the selected user selectable link, or generate a new user selectable link (e.g., as shown in FIG. 16C). The user may then select the updated or new user selectable link to cause the user device 102 to launch the native application on the user device 102, and set the launched application into the application state specified by the AAM, in a similar manner as described below with reference to block 1518. In any case, upon launching the native application, and setting the launched application into the application state, the user device 102 may resize, suspend (e.g., pause), minimize, move to the background, terminate (e.g., close), or otherwise manipulate the previously launched web-based application and the application state thereof such that the user is able to interact with (e.g., perform one or more functions using) the newly launched native application and the application state thereof on the user device 102.

Accordingly, in block 1518, upon downloading and installing the native application, the user device 102 launches the application on the user device 102, and sets the launched application into the application state specified by the AAM using the AAM, in a similar manner as described above with reference to FIG. 13 (e.g., automatically, or in response to a user input, such as an acceptance of a user prompt, or a selection of an updated or new user selectable link). For example, to set the native application into the application state, the user device 102 may cause the application to perform the one or more operations indicated by the AAM.

FIGS. 16A-16D illustrate still other example GUIs that may be generated on one of the user devices 102 according to the present disclosure. FIGS. 16A, 16C, and 16D are analogous to FIGS. 14A, 14C, and 14D, respectively, and include some of the same or similar elements (e.g., user selectable links, headers, and other GUI elements, such as search fields, search buttons, and other buttons or links) as those described above with reference to FIGS. 14A, 14C, and 14D. FIG. 16B shows a GUI 474 displayed on the user device 460 as a result of the user of the user device 460 interacting with the GUI 462 of FIG. 16A, as described below.

As described herein, the user selectable link 464 included in the GUI 462 of FIG. 16A may include an AAM that specifies an application state of Urbanspoon. As also described herein, because Urbanspoon is not installed on the user device 460, the link 464 may further include an application download address that indicates a location (e.g., a digital distribution platform) where the user device 460 may download Urbanspoon. In the example of FIGS. 16A-16D, the link 464 may also include a WAM that specifies an application state of a web-based version of Urbanspoon (e.g., reference the web-based version, and indicates one or more operations for the web-based version to perform). For example, the application state of the web-based version of Urbanspoon specified by the WAM may correspond, or be similar to (e.g., include some or all of the same or similar information as) the application state of Urbanspoon specified by the AAM included in the link 464.

In the example of FIGS. 16A-16D, in response to the user selecting the link 464, the user device 460 may access (e.g., automatically, or via a user prompt) the application state of the web-based version of Urbanspoon using the WAM, as shown in FIG. 16B. For example, the user device 460 may launch a web browser application 120 included on the user device 460. The user device 460 may then direct the launched web browser application 120 to a web resource (e.g., a web page of a website) corresponding to the application state of the web-based version of Urbanspoon using a resource identifier (e.g., a URL, or a web address) included in the WAM. The example GUI 474 of FIG. 16B depicts what the GUI, or screen, of the web-based version of Urbanspoon might look like upon the user device 460 accessing the application state of the web-based version of Urbanspoon in the manner described above. The user may then interact with the application state (e.g., perform one or more functions that may be the same as, or similar to, functions provided by the application state of Urbanspoon specified by the AAM included in the link 464). Notably, as shown in FIG. 16B, the GUI 474 includes the same or similar information as the GUI 472 corresponding to the application state of Urbanspoon specified by the AAM.

Additionally, also in response to the user selecting the link 464 (e.g., in parallel with accessing the application state of the web-based version of Urbanspoon), the user device 460 may download and install Urbanspoon (e.g., automatically, or via a user prompt) using the application download address included in the link 464, as described herein. Upon downloading and installing Urbanspoon, the user device 460 may display (e.g., automatically, or via a user prompt) the GUI 468 of FIG. 16C, or the GUI 472 of FIG. 14D, as also described herein. For example, the user device 460 may display any of the GUIs 468 and 472 in place of the GUI 474 of FIG. 16B. With reference to FIG. 16C, upon the user selecting the link 470, the user device 460 may launch Urbanspoon, and set Urbanspoon into the application state specified by the AAM included in the links 464 and 470, as shown in FIG. 16D. With reference to FIG. 16D, alternatively, upon the user device 460 downloading and installing Urbanspoon, the user device 460 may automatically launch Urbanspoon, and set Urbanspoon into the application state depicted in FIG. 16D, without displaying the GUI 468.

In some examples consistent with the techniques of this disclosure, the search system 100 may transmit one or more AAMs to the user device 102, including AAM(s) that reference native applications that are included (e.g., installed) on the user device 102 and/or AAM(s) that reference native applications that are not included on the user device 102. The user device 102 may generate a user selectable link for each AAM, such that the link includes the AAM. In some examples, the user device 102 may first determine whether the native applications referenced by the AAMs are included on the user device 102, and then generate the user selectable links for the AAMs such that each link indicates (e.g., using text and/or image data) to the user whether the corresponding native application is included on the user device 102. For example, each link that is associated with a native application that is included on the user device 102 may include a GUI element that includes the string "Open," indicating that the application is included on the user device 102. In contrast, each link that is associated with a native application that is not included on the user device 102 may include a GUI element that includes the string "Download," or "Install," indicating that the application is not included on the user device 102. In other examples, the links may not indicate whether the corresponding native applications are included on the user device 102. In these examples, the user device 102 may determine whether the native application referenced by a particular one of the AAMs is included on the user device 102 upon the user selecting the corresponding link. In the event the native application is included on the user device 102, the user device 102 may launch the application and set the application into an application state specified by the AAM. Alternatively, in the event the native application is not included on the user device 102, the user device 102 may download, install, and launch the application, and set the application into the application state specified by the AAM.

In some examples, the user device 102 may determine whether the native applications referenced by the AAMs are included (e.g., installed) on the user device 102 by analyzing (e.g., parsing) the search results 130 received from the search system 100 and interacting with an OS of the user device 102. In one example (e.g., when using the Android® OS), the user device 102 (e.g., the search application 116) may parse the search results 130 for application identifiers (AppIDs), package names, or equivalent data structures that identify the native applications referenced by the AAMs. For each AppID, package name, or equivalent data structure, the user device 102 may then query the OS to determine whether the corresponding native application is included on the user device 102. In response to the query, the OS (e.g., Android® OS) may return an indication (e.g., a Boolean character) of whether the corresponding native application is included on the user device 102. The user device 102 may then determine whether the native application is included on the user device 102 using the indication. In other examples, the user device 102 may determine whether the native applications referenced by the AAMs are included on the user device 102 using other techniques.

As described herein, upon the user selecting a particular one of the user selectable links, the user device 102 launches the native application referenced by the AAM included in the link, and sets the application into an application state specified by the AAM. According to the techniques described herein, each of the AAMs may be associated with a particular edition of the native application referenced by the AAM. For example, the OS (e.g., the Android® OS) may provide an indication (e.g., a version code) that specifies (e.g., via integer) an edition of a particular native application that is included on the user device 102. In some examples, upon the user selecting a user selectable link that includes an AAM, the user device 102 may determine whether the AAM references an edition of a native application that is included on the user device 102. Additionally, or alternatively, in examples where the link includes multiple AAMs that reference different editions of a native application, the user device 102 may determine whether any of the AAMs references the edition of the native application that is included on the user device 102. In the event an AAM included in the link reference the edition of the native application that is included on the user device 102, the user device 102 may launch the native application and set the application into an application state specified by the AAM.

In some examples, upon the user selecting a header used to group one or more of the links according to native application (e.g., the Yelp header 114g of FIG. 2), the user device 102 may launch the native application referenced by the one or more AAMs included in the links grouped by the header, and set the application into a default, or main application state (e.g., a home screen, or page). In other examples, the user selecting the header may lead to a different response (e.g., launching the native application and setting the application into a specific, or non-default application state), or to no response, by the user device 102.

Additionally, in some examples, upon the user selecting a particular one of the user selectable links, the search application 116 may continue to execute in the background (e.g., as a service) on the user device 102. For example, upon the user selecting the link, the user device 102 may download, install, and launch the native application referenced by the AAM included in the link, and set the application into an application state specified by the AAM, while the search application 116 executes in the background on the user device 102. In this example, the search application 116 executing in the background may launch the native application and set the application into the application state upon the user device 102 downloading and installing the application. Additionally, or alternatively, upon the user selecting the link, the user device 102 may launch a web-based application referenced by a WAM included in the link, and set the application into an application state specified by the WAM, while the search application 116 executes in the background on the user device 102. In this example, the search application 116 executing in the background may resize, suspend, minimize, move to the background, or close the web-based application upon the user device 102 downloading and installing the application.

The modules and data stores included in the search system 100 represent features that may be included in the search system 100 of the present disclosure. For example, the search module 110 and the data store 108 may represent features included in the search system 100. The modules and data stores described herein may be embodied by electronic hardware, software, firmware, or any combination thereof. Depiction of different features as separate modules and data stores does not necessarily imply whether the modules and data stores are embodied by common or separate electronic hardware or software components. In some implementations, the features associated with the one or more modules and data stores depicted herein may be realized by common electronic hardware and software components. In some implementations, the features associated with the one or more modules and data stores depicted herein may be realized by separate electronic hardware and software components.

The modules and data stores may be embodied by electronic hardware and software components including, but not limited to, one or more processing units, one or more memory components, one or more input/output (I/O) components, and interconnect components. The interconnect components may be configured to provide communication between the one or more processing units, the one or more memory components, and the one or more I/O components. For example, the interconnect components may include one or more buses that are configured to transfer data between electronic components. The interconnect components may also include control circuits (e.g., a memory controller and/or an I/O controller) that are configured to control communication between electronic components.

The one or more processing units may include one or more central processing units (CPUs), graphics processing units (GPUs), digital signal processing units (DSPs), or other processing units. The one or more processing units may be configured to communicate with the one or more memory components and I/O components. For example, the one or more processing units may be configured to communicate with the one or more memory components and I/O components via the interconnect components.

A memory component, or memory, may include any volatile or non-volatile media. For example, the memory may include, but is not limited to, electrical media, magnetic media, and/or optical media, such as a random access memory (RAM), read-only memory (ROM), non-volatile RAM (NVRAM), electrically-erasable programmable ROM (EEPROM), Flash memory, hard disk drives (HDD), magnetic tape drives, optical storage technology (e.g., compact disc, digital versatile disc, and/or Blu-ray Disc), or any other memory components.

The one or more memory components may include (e.g., store) the data described herein. For example, the one or more memory components may include the data included in the function records of the data store 108. The one or more memory components may also include instructions that may be executed by the one or more processing units. For example, the one or more memory components may include computer-readable instructions that, when executed by one or more processing units, cause the one or more processing units to perform the various functions attributed to the modules and data stores described herein.

The one or more I/O components may refer to electronic hardware and software that provides communication with a variety of different devices. For example, the one or more I/O components may provide communication between other devices and the one or more processing units and memory components. In some examples, the one or more I/O components may be configured to communicate with a computer network. For example, the one or more I/O components may be configured to exchange data over a computer network using a variety of different physical connections, wireless connections, and protocols. The one or more I/O components may include network interface components (e.g., a network interface controller), repeaters, network bridges, network switches, routers, and firewalls. In some examples, the one or more I/O components may include hardware and software that is configured to communicate with various human interface devices, including, but not limited to, display screens, keyboards, pointer devices (e.g., a mouse), touchscreens, speakers, and microphones. In some examples, the one or more I/O components may include hardware and software that is configured to communicate with additional devices, such as external memory (e.g., external HDDs).

In some implementations, the search system 100 may be a system of one or more computing devices (e.g., a computer search system) that is configured to implement the techniques described herein. Put another way, the features attributed to the modules and data stores described herein may be implemented by one or more computing devices. Each of the one or more computing devices may include any combination of electronic hardware, software, and/or firmware described above. For example, each of the one or more computing devices may include any combination of the one or more processing units, memory components, I/O components, and the interconnect components described above. The one or more computing devices may also include various human interface devices, including, but not limited to, display screens, keyboards, pointing devices (e.g., a mouse), touchscreens, speakers, and microphones. The one or more computing devices may also be configured to communicate with additional devices, such as external memory (e.g., external HDDs).

The one or more computing devices of the search system 100 may be configured to communicate with the network 106. The one or more computing devices may also be configured to communicate with one another via a computer network. In some examples, the one or more computing devices may include one or more server computing devices configured to communicate with the user devices 102 (e.g., receive search queries 128, and transmit search results 130), gather data from the data sources 104, index the data, store the data, and store other documents. The one or more computing devices may reside within a single machine at a single geographic location in some examples. In other examples, the one or more computing devices may reside within multiple machines at a single geographic location. In still other examples, the one or more computing devices may be distributed across a number of geographic locations.

Additionally, the various implementations of the search system 100 described above (e.g., using one or more computing devices that include one or more processing units, memory components, I/O components, and interconnect components) are equally applicable to any of the user devices 102, as well as to the various components thereof, as described herein.

What is claimed is:

1. A method comprising:
transmitting a search query to a search system configured to generate search results in response to a received search query;
receiving search results from the search system in response to transmitting the search query, wherein the search results include a plurality of groups of search results, wherein each group respectively corresponds to a native application, and wherein each of the search results includes:
an application access mechanism that references the native application and indicates one or more operations for the native application to perform; and
an application download address that indicates a location at which the native application may be downloaded;
for each of the search results, generating a user selectable link, wherein the user selectable link includes the application access mechanism and the application download address;
displaying the plurality of groups of search results, wherein each of the plurality of groups of search results includes (i) a header corresponding to a default state of the corresponding native application and (ii) user selectable links grouped with the header, and wherein each user selectable link is associated with the application access mechanism for the corresponding native application;
receiving a user selection of one of the user selectable links; and
in response to receiving the user selection:
downloading the native application corresponding to the user selection using the application download address,
installing the native application,
launching the native application, and
causing the native application to perform the one or more operations.

2. The method of claim 1, wherein, for each of the search results:
the application access mechanism specifies an application state of the native application referenced by the application access mechanism; and
the native application performing the one or more operations indicated by the application access mechanism sets the native application into the application state.

3. The method of claim 1, further comprising:
receiving a user input,
wherein the downloading, installing, launching, and causing the native application to perform the one or more operations is performed in response to receiving the user selection and in response to receiving the user input.

4. The method of claim 3, wherein:
the user selectable link comprises a first user selectable link;
the user selection comprises a first user selection; and
the downloading, installing, launching, and causing the native application to perform the one or more operations comprises:
in response to receiving the first user selection, accessing the location indicated by the application download address;
displaying a graphical user interface (GUI) associated with the location, wherein the GUI includes a second user selectable link that is different than the first user selectable link, and wherein the user input comprises a second user selection of the second user selectable link that is different than the first user selection; and
in response to receiving the second user selection, downloading the native application from the location, installing the native application, launching the native application, and causing the native application to perform the one or more operations.

5. The method of claim 3, wherein the downloading, installing, launching, and causing the native application to perform the one or more operations comprises:
in response to receiving the user selection, downloading the native application from the location and installing the native application; and
in response to receiving the user input, launching the native application, and causing the native application to perform the one or more operations.

6. The method of claim 5, wherein:
the user selectable link comprises a first user selectable link;
the user selection comprises a first user selection; and
launching the native application and causing the native application to perform the one or more operations in response to receiving the user input comprises:
generating a second user selectable link that is different that the first use selectable link, wherein the second user selectable link includes the application access mechanism;
displaying the second user selectable link, wherein the user input comprises a second user selection of the second user selectable link that is different than the first user selection; and
in response to receiving the second user selection, launching the native application and causing the native application to perform the one or more operations.

7. The method of claim 6, wherein:
the application access mechanism comprises a first application access mechanism;
the search results further include a second application access mechanism that is different than the first application access mechanism;
the first application access mechanism and second application access mechanism reference different editions of the native application;
the method further comprises determining that the first application access mechanism references an edition of the native application downloaded from the location indicated by the application download address; and
generating the second user selectable link comprises generating the second user selectable link such that the second user selectable link includes the first application access mechanism and excludes the second application access mechanism based on the determination.

8. The method of claim 6, wherein:
the application access mechanism comprises a first application access mechanism;
the search results further include a second application access mechanism that is different than the first application access mechanism;
the first application access mechanism and second application access mechanism reference different editions of the native application;
generating the second user selectable link comprises generating the second user selectable link such that the second user selectable link further includes the second application access mechanism;

the method further comprises determining that the first application access mechanism references an edition of the native application downloaded from the location indicated by the application download address; and launching the native application and causing the native application to perform the one or more operations in response to receiving the second user selection comprises launching the native application and causing the native application to perform the one or more operations based on the determination.

9. The method of claim 1, further comprising:
transmitting an indication that the native application is not installed to the search system,
wherein receiving the search results from the search system comprises receiving the search results such that the search results include the application download address in response to transmitting the indication.

10. The method of claim 1, wherein:
the application access mechanism specifies an application state of the native application;
the native application performing the one or more operations sets the native application into the application state;
the search results further include a web access mechanism that references a web-based application and indicates one or more operations for the web-based application to perform;
the web access mechanism specifies a web application state of the web-based application;
the web-based application performing the one or more operations sets the web-based application into the web application state;
the web application state of the web-based application is similar to the application state of the native application;
generating the user selectable link comprises generating the user selectable link such that the user selectable link further includes the web access mechanism; and
the method further comprises, in response to receiving the user selection, launching the web-based application and causing the web-based application to perform the one or more operations indicated by the web access mechanism.

11. The method of claim 10, wherein the web access mechanism is configured to direct a web browser application to a web version of the application state of the native application specified by the application access mechanism.

12. The method of claim 10, further comprising:
receiving a user input,
wherein launching the web-based application and causing the web-based application to perform the one or more operations indicated by the web access mechanism in response to receiving the user selection comprises launching the web-based application and causing the web-based application to perform the one or more operations in response to receiving the user selection and in response to receiving the user input.

13. The method of claim 10, further comprising performing one of the following:
(1) minimizing the web-based application;
(2) moving the web-based application to a background; and
(3) terminating the web-based application.

14. The method of claim 13, wherein performing the one of minimizing, moving to the background, and terminating the web-based application comprises performing the one of minimizing, moving to the background, and terminating the web-based application upon completing one or more of downloading, installing, and launching the native application, and causing the native application to perform the one or more operations.

15. The method of claim 13, further comprising:
receiving a user input,
wherein performing the one of minimizing, moving to the background, and terminating the web-based application comprises performing the one of minimizing, moving to the background, and terminating the web-based application in response to receiving the user input.

16. The method of claim 11, further comprising:
transmitting an indication that the native application is not installed to the search system,
wherein receiving the search results from the search system comprises receiving the search results such that the search results include the web access mechanism in response to transmitting the indication.

17. The method of claim 1, wherein:
the search results further include link data associated with the application access mechanism;
the link data includes one or more of text and image data that describes the application access mechanism; and
generating the user selectable link comprises generating the user selectable link using the link data.

18. The method of claim 17, wherein:
the application access mechanism specifies an application state of the native application;
the native application performing the one or more operations indicated by the application access mechanism sets the native application into the application state; and
the one or more of text and image data included in the link data describes the application state.

19. A system comprising one or more computing devices configured to:
transmit a search query to a search system configured to generate search results in response to a received search query;
receive search results from the search system in response to transmitting the search query, wherein the search results include a plurality of groups of search results, wherein each group respectively corresponds to a native application, and wherein each of the search results includes:
an application access mechanism that references the native application and indicates one or more operations for the native application to perform, and
an application download address that indicates a location at which the native application may be downloaded;
for each of the search results, generate a user selectable link, wherein the user selectable link includes the application access mechanism and the application download address;
display the plurality of groups of search results, wherein each of the plurality of groups of search results includes (i) a header corresponding to a default state of the corresponding native application and (ii) user selectable links grouped with the header, and wherein each user selectable link is associated with the application access mechanism for the corresponding native application;
receive a user selection of one of the user selectable links; and
in response to receiving the user selection:
download the native application corresponding to the user selection using the application download address, install the native application, launch the native application, and cause the native application to perform the one or more operations.

20. A non-transitory computer-readable storage medium comprising instructions that cause one or more computing devices to:

transmit a search query to a search system configured to generate search results in response to a received search query;

receive search results from the search system in response to transmitting the search query, wherein the search results include a plurality of groups of search results, wherein each group respectively corresponds to a native application, and wherein each of the search results includes:

an application access mechanism that references the native application and indicates one or more operations for the native application to perform, and an application download address that indicates a location at which the native application may be downloaded;

for each of the search results, generate a user selectable link, wherein the user selectable link includes the application access mechanism and the application download address;

display the plurality of groups of search results, wherein each of the plurality of groups of search results includes (i) a header corresponding to a default state of the corresponding native application and (ii) user selectable links grouped with the header, and wherein each user selectable link is associated with the application access mechanism for the corresponding native application;

receive a user selection of one of the user selectable links; and in response to receiving the user selection:

download the native application corresponding to the user selection using the application download address, install the native application, launch the native application, and cause the native application to perform the one or more operations.

* * * * *